(12) United States Patent
Peck et al.

(10) Patent No.: US 12,492,097 B2
(45) Date of Patent: Dec. 9, 2025

(54) PORTABLE DRILL PULLER

(71) Applicant: Greenlee Tools, Inc., Rockford, IL (US)

(72) Inventors: Austin Peck, Rockford, IL (US); Andrew Troy, Rockford, IL (US); Fernando Paz, Rockford, IL (US); Joshua Kerns, Rockford, IL (US); Natalie Adele Hendrix, Rockford, IL (US)

(73) Assignee: GREENLEE TOOLS, INC., Rockford, IL (US)

( * ) Notice: Subject to any disclaimer, the term of this patent is extended or adjusted under 35 U.S.C. 154(b) by 723 days.

(21) Appl. No.: 17/605,829

(22) PCT Filed: Apr. 22, 2020

(86) PCT No.: PCT/US2020/029337
§ 371 (c)(1),
(2) Date: Oct. 22, 2021

(87) PCT Pub. No.: WO2020/219558
PCT Pub. Date: Oct. 29, 2020

(65) Prior Publication Data
US 2022/0267116 A1    Aug. 25, 2022

Related U.S. Application Data

(60) Provisional application No. 62/839,135, filed on Apr. 26, 2019.

(51) Int. Cl.
*H02G 1/08* (2006.01)
*B65H 75/30* (2006.01)
(Continued)

(52) U.S. Cl.
CPC ......... *B65H 75/305* (2013.01); *B66D 1/7447* (2013.01); *H02G 1/08* (2013.01);
(Continued)

(58) Field of Classification Search
CPC ............... B65H 75/305; B65H 75/406; B65H 2402/412; B65H 75/2227; B65H 75/14;
(Continued)

(56) References Cited

U.S. PATENT DOCUMENTS

| | | | | |
|---|---|---|---|---|
| 1,361,250 | A | * 12/1920 | Green ................ | B65H 75/2272 242/118.62 |
| 1,408,463 | A | * 3/1922 | Miles ....................... | B66D 1/30 254/374 |

(Continued)

FOREIGN PATENT DOCUMENTS

| | | | | |
|---|---|---|---|---|
| DE | 202012001533 U1 | * | 5/2012 | ............. B65H 75/40 |
| EP | 3521228 A1 | * | 8/2019 | ............. B65H 75/40 |

OTHER PUBLICATIONS

G1 Versi-Tugger™ found at: https://www.youtube.com/watch?v=cUXACiH0xwg&t=13s (Year: 2021).*
(Continued)

*Primary Examiner* — Mahdi H Nejad
(74) *Attorney, Agent, or Firm* — Klintworth & Rozenblat LLP

(57) ABSTRACT

A puller in accordance with some example embodiments includes a frame and a capstan rotatably mounted on the frame. The capstan has a body having an angled wall portion and a movable end wall. A boom is mounted to the frame and has a head at an end thereof which can be positioned in a variety of positions.

31 Claims, 24 Drawing Sheets

(51) Int. Cl.
B65H 75/38 (2006.01)
B65H 75/40 (2006.01)
B66D 1/74 (2006.01)

(52) U.S. Cl.
CPC ............. H02G 1/081 (2013.01); H02G 1/085 (2013.01); *B65H 75/40* (2013.01); *B65H 2402/412* (2013.01)

(58) Field of Classification Search
CPC ...... B65H 75/40; B66D 1/7447; H02G 1/081; H02G 1/085; H02G 1/083; H02G 1/08; H02G 1/06; A01K 89/003
USPC ................ 242/613.1, 134.3 FT, 118.4, 118.6
See application file for complete search history.

(56) References Cited

U.S. PATENT DOCUMENTS

| | | | | |
|---|---|---|---|---|
| 1,536,927 A * | 5/1925 | Rehart | ................... | E21B 19/008 242/903 |
| 2,049,086 A * | 7/1936 | Shingleton | ............. | H02G 11/02 242/396.6 |
| 2,225,180 A * | 12/1940 | Olesen | .................... | B65H 54/58 242/125.1 |
| 2,518,533 A * | 8/1950 | Edwards | ............ | B65H 75/2227 242/118.5 |
| 2,602,599 A * | 7/1952 | Bub | ........................ | H02G 11/02 242/470 |
| 3,330,499 A * | 7/1967 | Gooding | ................ | H01B 13/30 242/613.1 |
| 3,536,275 A * | 10/1970 | Salomon | ................ | H02G 11/02 242/406 |
| 3,717,315 A * | 2/1973 | Kovaleski | .......... | B65H 75/2263 242/610.6 |
| 3,970,268 A * | 7/1976 | Sheetz | ............... | B65H 75/2227 242/605 |
| 4,114,826 A * | 9/1978 | Diebolder | ............. | B65H 75/40 242/396.5 |
| 4,168,042 A * | 9/1979 | Joe | ....................... | B65H 75/148 244/155 A |
| 4,196,864 A * | 4/1980 | Cole | .................... | A01K 89/003 242/608.5 |
| 4,422,595 A * | 12/1983 | Thomas | ............. | B65H 75/2263 242/118.61 |
| 4,589,601 A * | 5/1986 | Scherer | .................. | B65H 75/00 242/918 |
| 5,277,350 A * | 1/1994 | Thornbury, Jr. | ..... | A63H 27/002 242/390.8 |
| 5,381,981 A * | 1/1995 | Nelson | ............... | B65H 75/2263 137/355.27 |
| 6,102,319 A * | 8/2000 | Annabel | .............. | B65H 75/148 242/125.1 |
| 6,578,823 B1 | 6/2003 | Johnson | | |
| 6,609,671 B2 * | 8/2003 | Heesch | ............... | A01K 89/0111 242/586 |
| 6,857,590 B2 * | 2/2005 | Heesch | ............... | A01K 89/0111 242/586 |
| D842,063 S | 3/2019 | DeBellis | | |
| 10,294,067 B1 | 5/2019 | DeBellis | | |
| D924,029 S | 7/2021 | Debellis | | |
| 11,139,643 B1 | 10/2021 | Debellis | | |
| 11,191,259 B1 * | 12/2021 | Nevius | ............... | A41D 19/0041 |
| 11,271,376 B1 * | 3/2022 | Beck | .................... | B66D 1/7489 |
| 11,440,765 B1 | 9/2022 | Debellis | | |
| 11,472,660 B1 | 10/2022 | Debellis | | |
| 11,641,094 B1 | 5/2023 | Beck et al. | | |
| 2003/0098384 A1 * | 5/2003 | Black | ................... | B65H 49/205 242/588.2 |
| 2003/0098386 A1 * | 5/2003 | Hashimoto | .......... | G11B 23/037 |
| 2005/0051759 A1 | 3/2005 | Plummer | | |
| 2007/0034845 A1 * | 2/2007 | Plummer | ............... | H02G 1/085 254/134.3 FT |
| 2007/0125474 A1 * | 6/2007 | Barker | ................ | B65H 37/005 156/577 |
| 2009/0039193 A1 * | 2/2009 | Plummer | ................ | B66D 1/36 242/407 |
| 2009/0078921 A1 | 3/2009 | Plummer | | |
| 2011/0057157 A1 | 3/2011 | Holley | | |
| 2018/0191141 A1 * | 7/2018 | Schmidt | ................ | H02G 1/085 |
| 2024/0327166 A1 * | 10/2024 | Poland | .............. | B65H 75/4465 |

OTHER PUBLICATIONS

Greenlee G1 Versi Tugger™ Found at: https://www.youtube.com/watch?v=nU1ZvXOKTsl (Year: 2024).*
Greenlee Webpage archive; Versi-Tugger™ (Mar. 13, 2020) https://web.archive.org/web/20200313013342/https://www.greenlee.com/us/en/g1-versi-tuggerhandheld-1000lb-puller https://www.greenlee.com/us/en/g1-versi-tugger-handheld-1000lb-puller (Year: 2020).*
European Search Report for EP20795292.0 Dated Mar. 3, 2023, 17 pages.
International Search Report for International Application No. PCT/US20/29337 mailed Sep. 24, 2020, 4 pages.
Written Opinion for International Application No. PCT/US20/29337 mailed Sep. 24, 2020, 7 pages.
Photograph of Electrical Product Innovation CP1000 publicly available as of Dec. 2017, 1 page.
Photograph of Southwire Maxis XD1 publicly available as of Dec. 2018, 1 page.
"G1 Versi-Tugger" (Grennleetools) Nov. 4, 2019 (Nov. 4, 2019) [online] retrieved from <URL: https://www.youtube.com/watch?v=C_RRHLNleoM> entire document, 1 page.

* cited by examiner

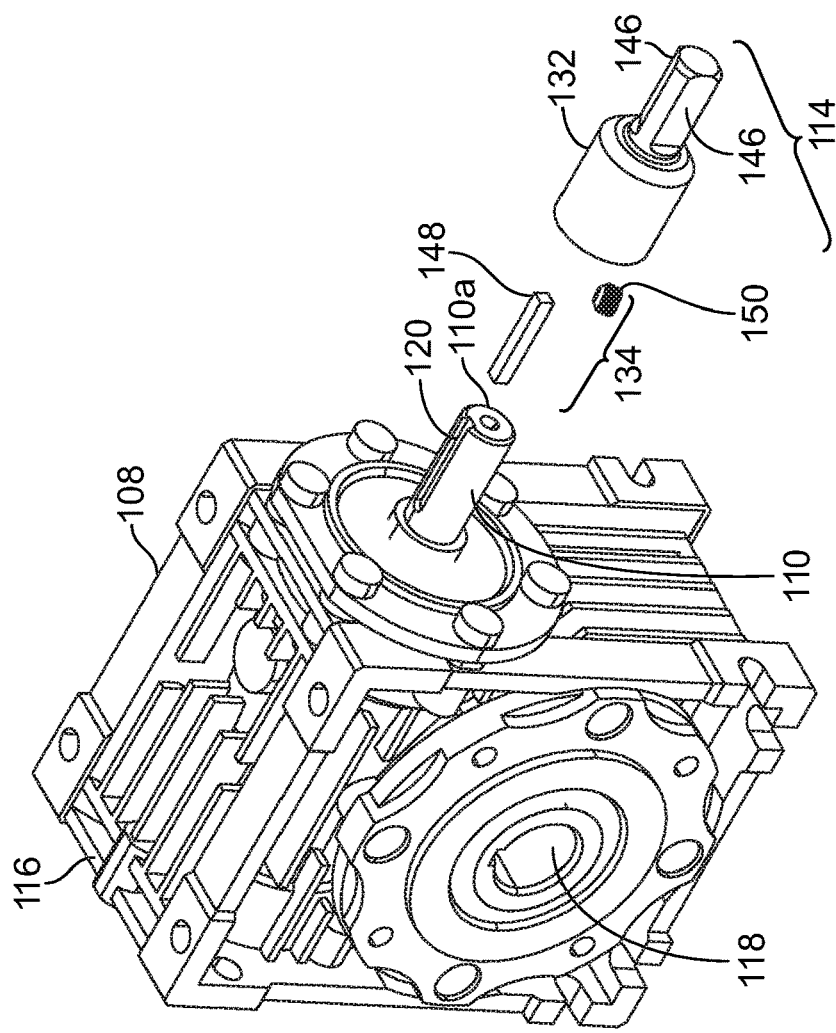
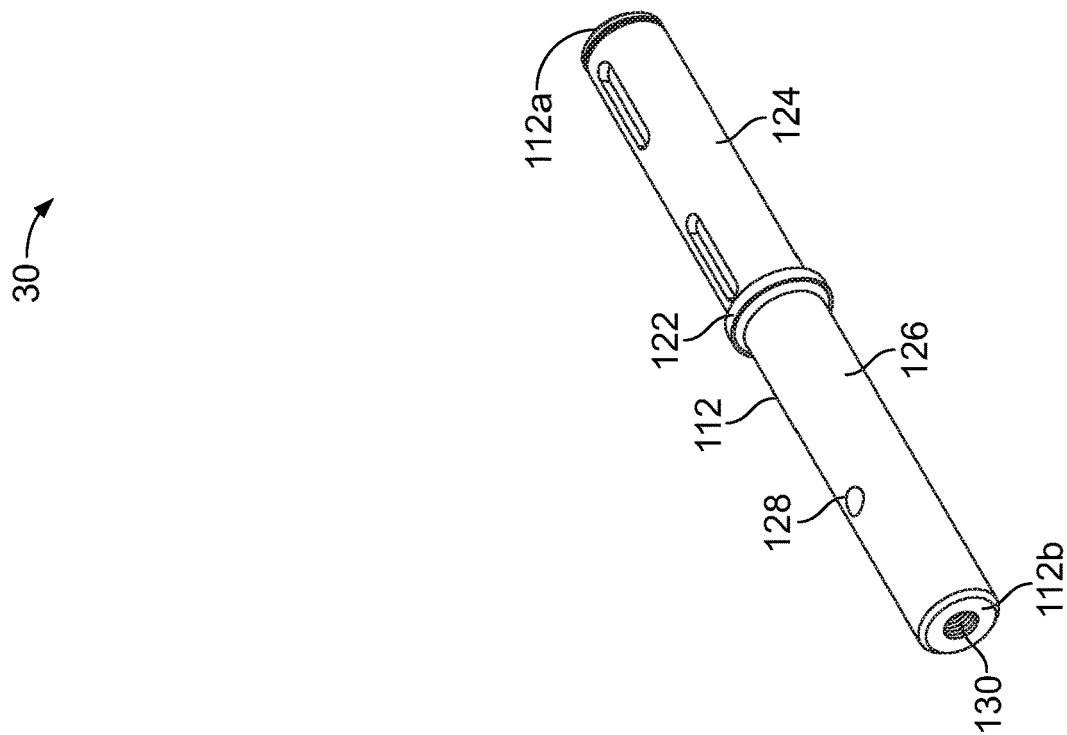
FIG. 12

PORTABLE DRILL PULLER

RELATED APPLICATION

This application claims the domestic priority of U.S. Provisional Patent Application Ser. No. 62/839,135 filed on Apr. 26, 2019, the contents of which are incorporated herein in its entirety.

FIELD OF THE DISCLOSURE

The present disclosure relates to a portable drill puller which is used to in a spooling situation and in a capstanning situation.

BACKGROUND

In the commercial electrical operator market, many jobs start with large cables that run to an electrical box which "branches" into many smaller circuits. During the installation of communication and electrical cable, operators first install conduit piping and then prepare the conduit run for the cable pulling process. First, the operator "fish" the run by installing a thin lightweight pull string (also known as Poly Line or jet line) or a flat, woven, polyester tape (often called mule tape), typically using a vacuum or blowing system. This lightweight pull string has a lower breaking strength and is either used to pull in a heavier duty rope for higher force cable pulls or pull smaller branch cables whose pulling load do not exceed the breaking strength of the lightweight pull string. The smaller branch circuit pulls can usually be pulled by hand by tying the lightweight pull string directly to the cable, but may be strenuous and/or time consuming for an operator to pull. On larger pulls that necessitate heavier duty rope, the operator is required to pull the heavier duty rope into the conduit by tying the heavier duty rope to the lightweight pull string and pulling the lightweight pull string by hand to pull the heavier duty rope into the conduit. Once the heavier duty rope is in the conduit, it can be attached to the electrical or comms cable to be installed. In all cases, the operator must grip the thin pull string and pull manually which can be hard on the operator's hands, may overall be a strenuous process, and can be a time intensive operation.

For some larger pulls, a cable puller may be used which has a spinning capstan in which the heavy-duty rope is wrapped around and then pulled on by the operator. Most cable pullers are larger machines that must be plugged into a power outlet and require some setup steps. Because of the size, cost, and setup involved, many operators will try to make due with pulling by hand. Other times when the rope is too hard to pull by one or two operators (i.e. a cable pull that requires 500 lbs of pulling force), the operator must rely on a 2000 lb-3000 lb cable puller, or larger, which requires a power outlet and might have limited portability.

SUMMARY

A puller in accordance with example embodiments includes a frame, a capstan operatively mounted to the frame and rotatable relative thereto, the capstan having a first and second opposite ends, the capstan having an upstanding end flange at the first end and a body extending from the end flange, the body having an angled wall portion which has a greatest diameter proximate to the first end and a smallest diameter proximate to the second end, and an upstanding end wall attached to the second end of the capstan, the end wall being movable relative to the capstan.

A drill puller in accordance with example embodiments includes a frame, a capstan operatively mounted to the frame and rotatable relative thereto, a drill coupled to the capstan and operable to rotate the capstan, a boom extending from the frame, a head having first and second sides and an outer edge extending therebetween, the head being rotatably coupled to the boom around an axis of rotation, the head including a plurality of spaced apart apertures extending between the sides and a recess formed in the outer edge thereof into which a conduit can be seated, a pin insertable through the boom and through one of the apertures, wherein the head is pivotable to a variety of positions relative to the boom with the pin locking the head into the variety of the positions, a bracket attached to the head, the bracket being spaced from the recess, and a roller attached to the bracket and rotatable relative thereto, the roller having an axis of rotation which is parallel to the axis of rotation of the head, the axis of rotation of the roller being on the second side of the of the axis of rotation of the head, the axis of rotation of the roller being offset from the recess and offset from the apertures.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIG. 12 depicts an exploded perspective view of a gearbox assembly of the portable drill puller;

DESCRIPTION

Figure 1:
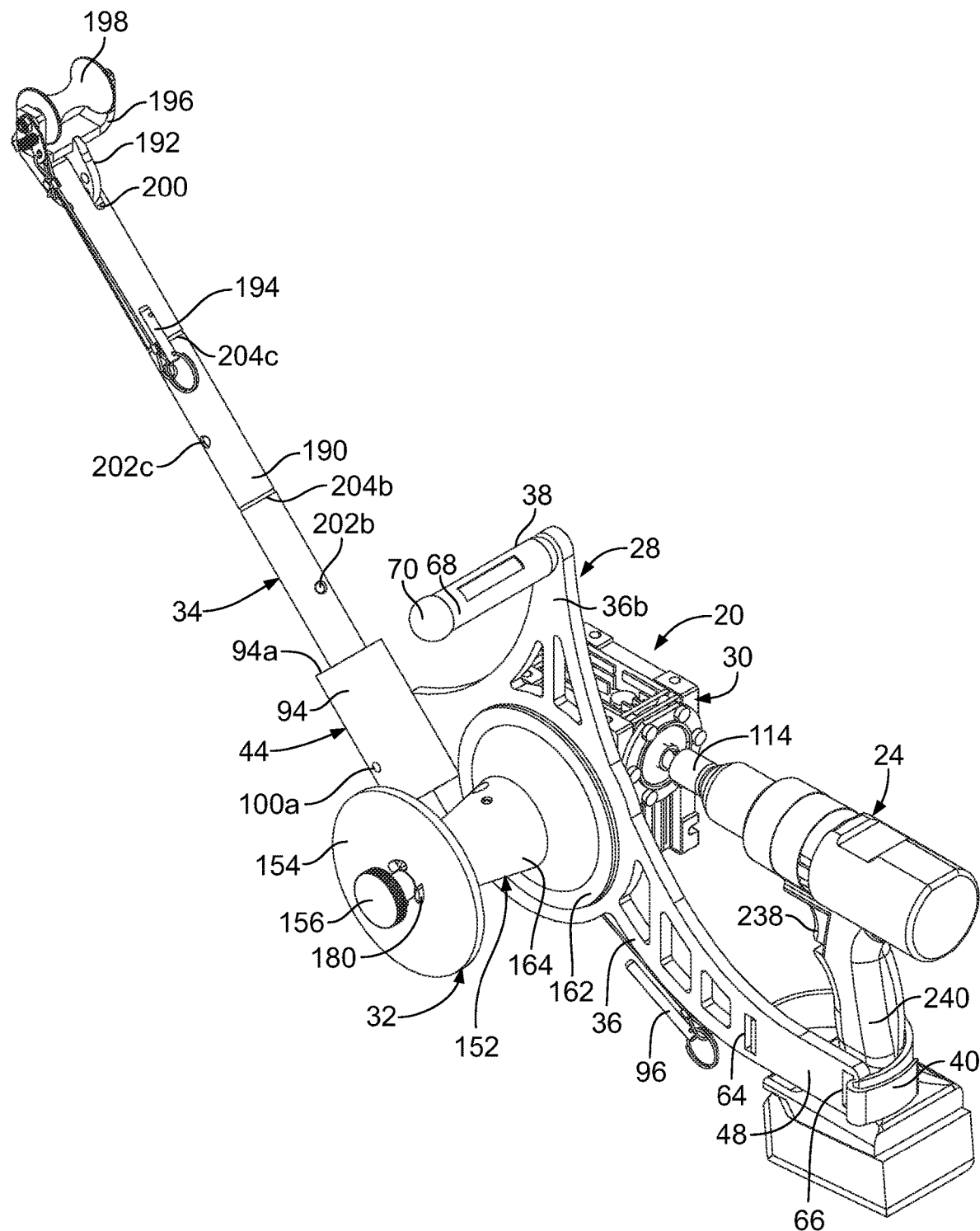
FIG. 1 depicts a perspective view of a portable drill puller having a conventional drill attached thereto.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

A portable drill puller 20 is provided which spools long lengths of a thin lightweight pull string 22, and provides the ability for an operator to unload the pull string 22 after the pull string 22 is spooled onto the drill puller 20. The pull string 22 may be a rope, may be Poly Line or jet line, may be mule tape which may be formed of nylon, or a flat, woven, polyester tape, and the like. Because the drill puller 20 spools the pull string 22, an operator has a second hand to help stabilize the drill puller 20 during operation. The drill puller 20 is used in combination with a conventional hand drill 24. The drill puller 20 is attached to a stationary conduit 26, see FIG. 6, as described herein through which the pull string 22 is routed as is known in the art.

The conduit 26 is mounted in a wall (not shown) to which the drill puller 20 is secured and through which the pull string 22 is to be pulled. The conduit 26 is generally cylindrically-shaped and includes an inner surface defining a passageway, an outer surface, and an end surface 26a. A plurality of threads (not shown) may be provided on the outer surface of the conduit 26 proximate to the end surface 26a.

Figure 3:
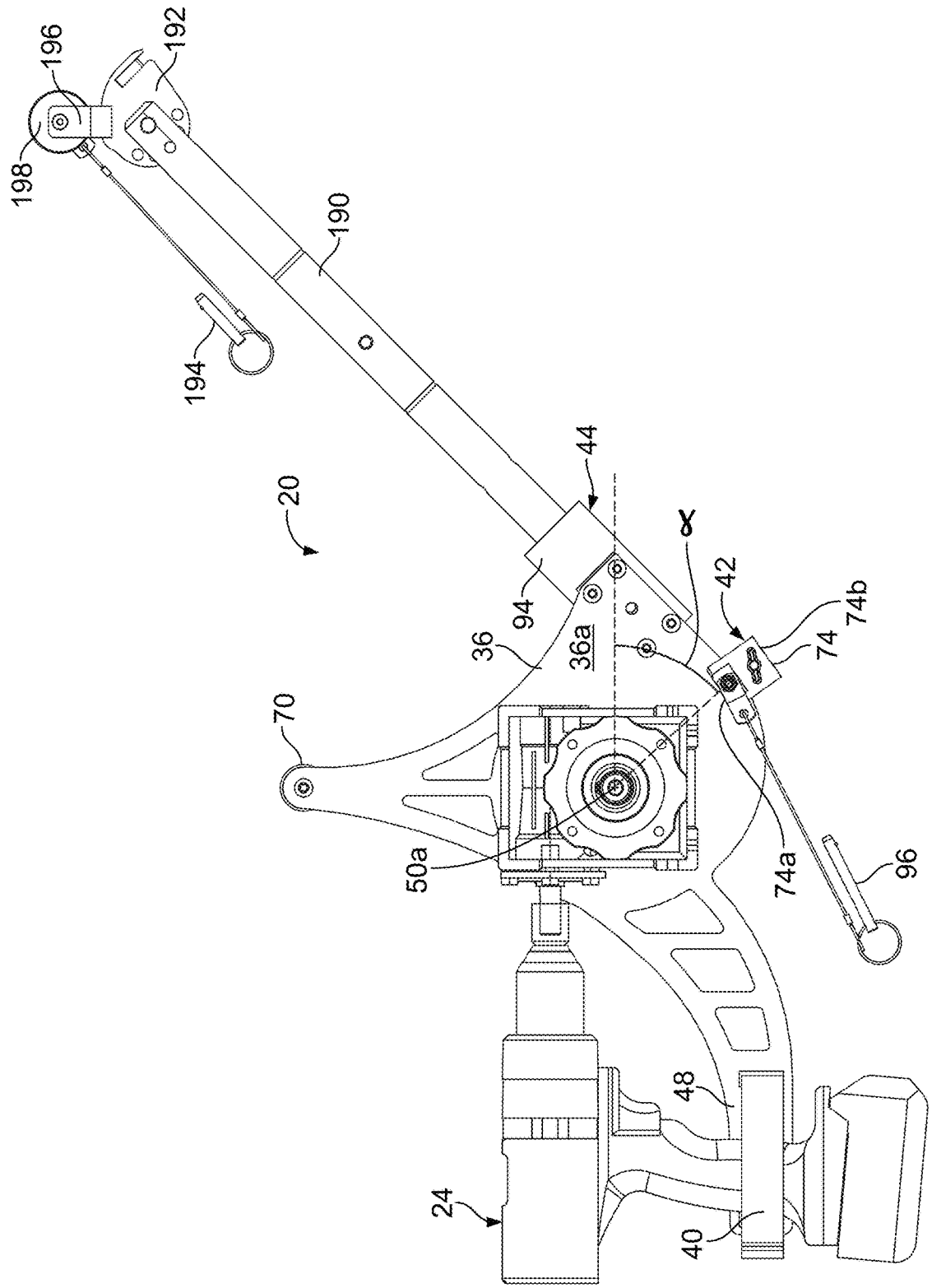
Figure 4:
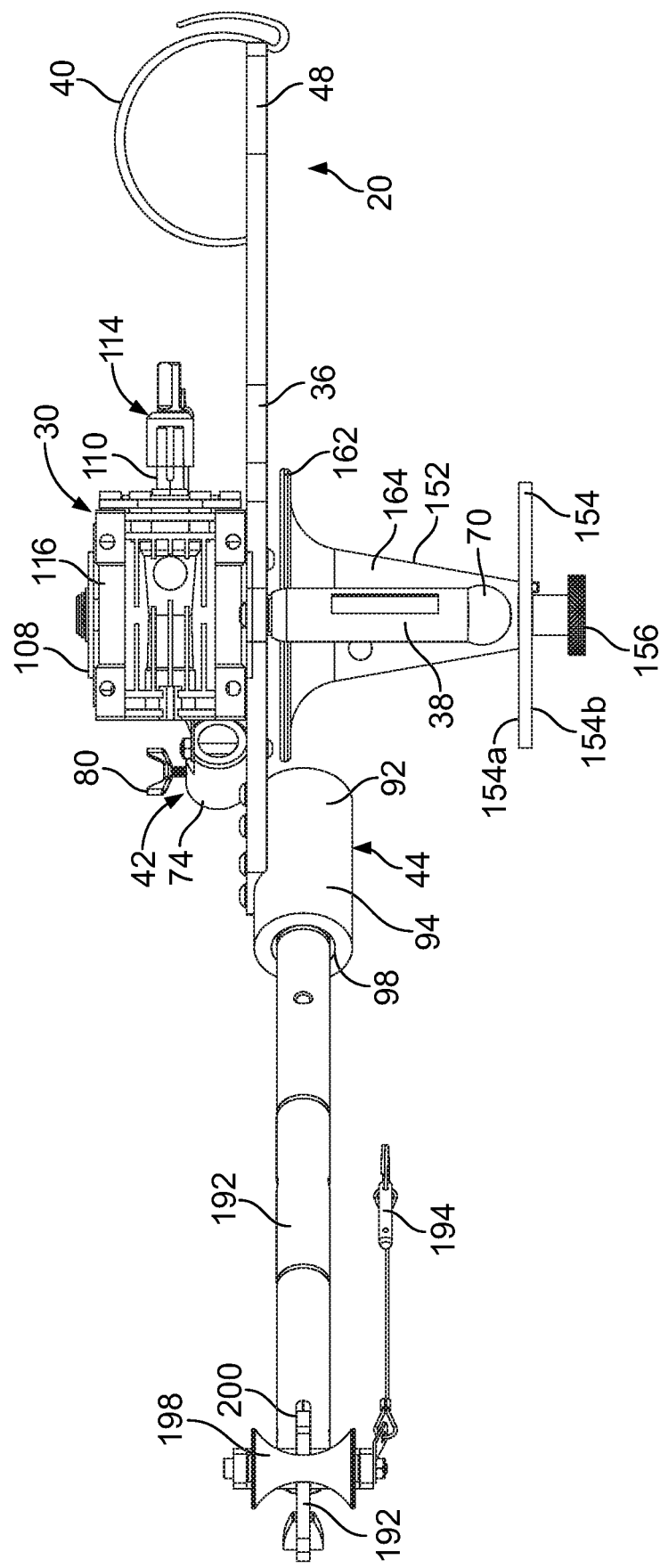
FIG. 4 depicts a top plan view of the portable drill puller.
Figure 5:
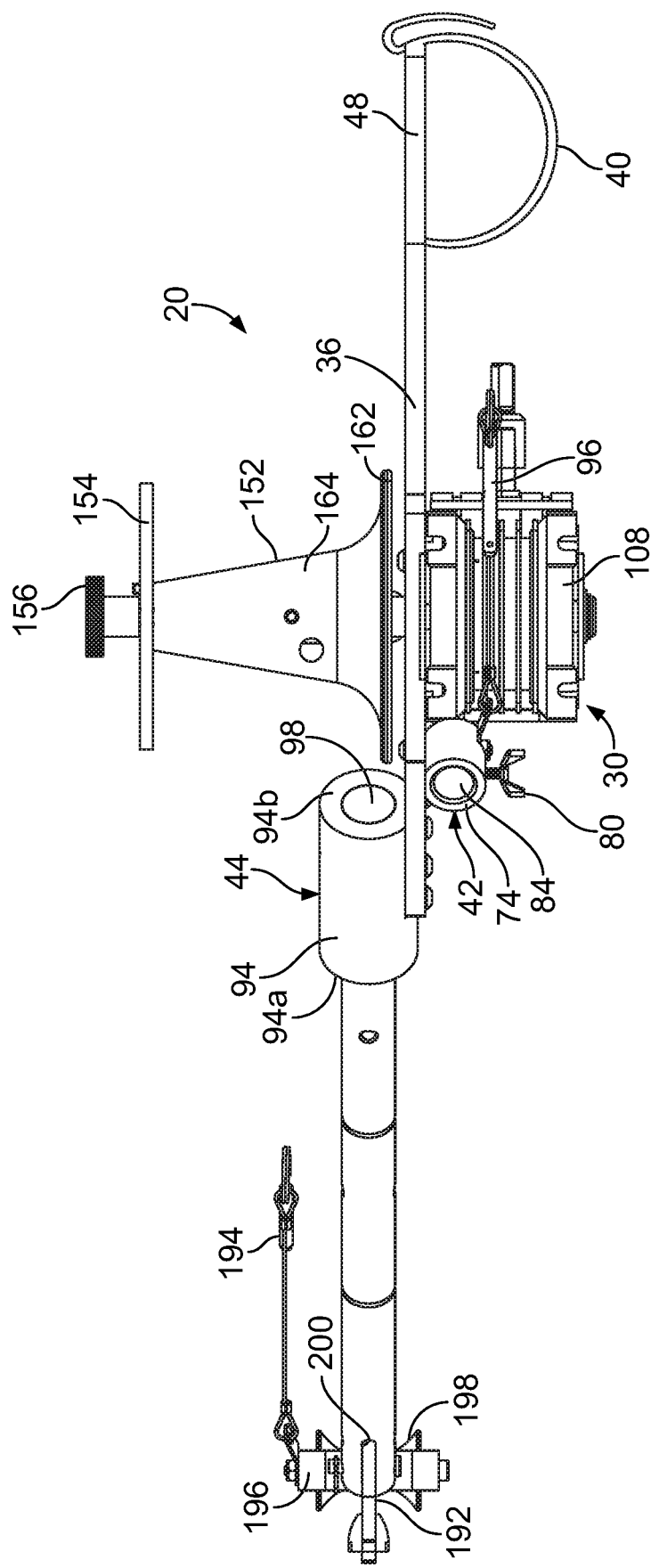
FIG. 5 depicts a top plan view of the portable drill puller.

As shown in FIG. 1, the drill puller 20 includes a frame assembly 28, a gearbox assembly 30 attached to the frame assembly 28, a capstan assembly 32 attached to the frame assembly 28 and the gearbox assembly 30, and a boom assembly 34 attached to the frame assembly 28. The drill puller 20 is described in the orientation shown in the drawings wherein the boom assembly 34 extends upwardly and to the left from the frame assembly 28 for ease in description; it is to be understood that this is not a required orientation for use. In use, the conduit 26 is usually vertical or horizontal relative to the ground; not angled as shown in FIG. 3.

Figure 2:
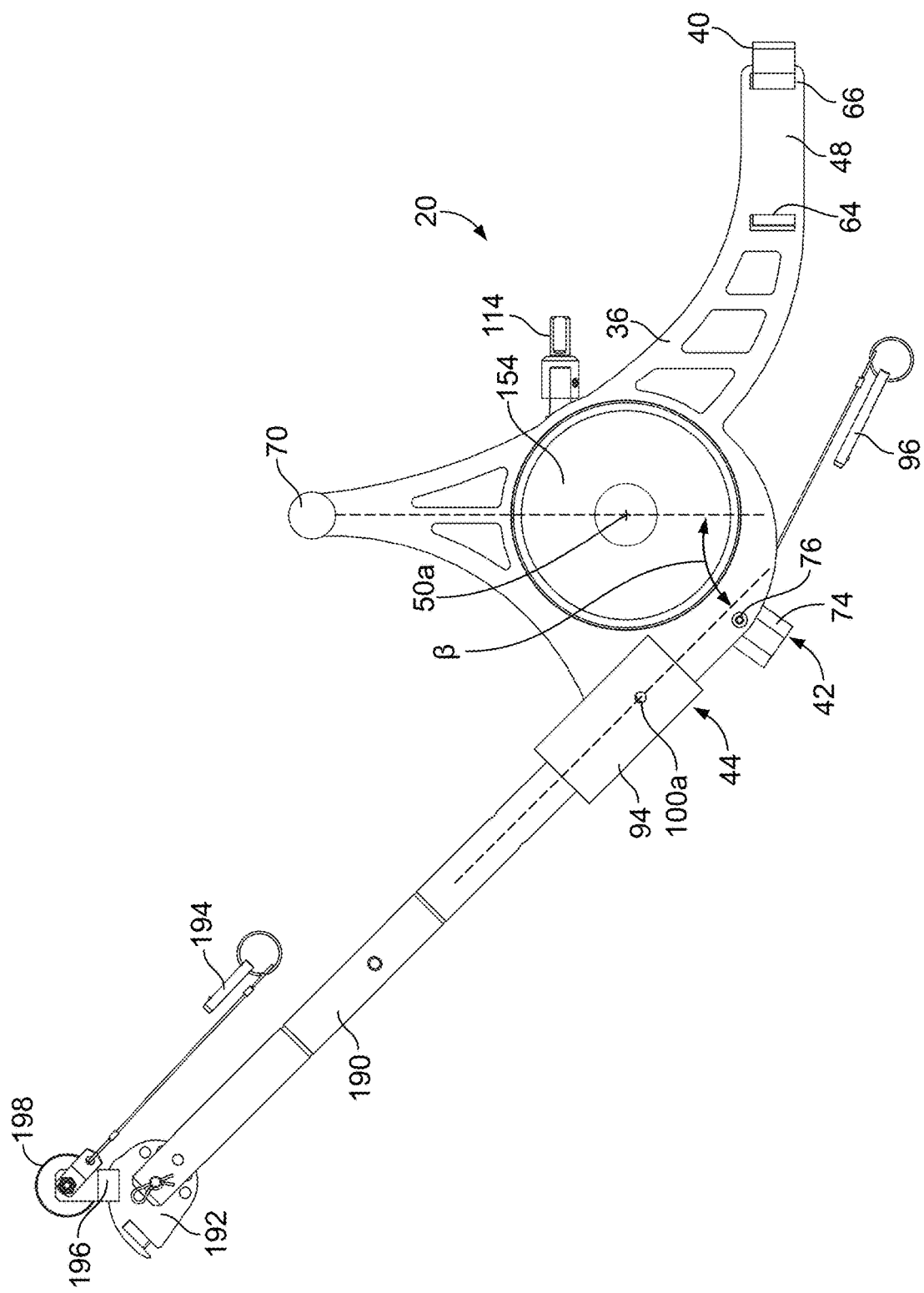
FIGS. 2 and 3 depict side elevation views of the portable drill puller.

The frame assembly 28 includes a frame 36, a handle 38 attached to the frame 36, a drill mounting strap 40 attached to the frame 36, a monopod mount 42, see FIG. 2, attached to the frame 36, and a boom retaining assembly 44 attached to the frame 36.

The frame 36 has planar first and second surfaces 36a, 36b and includes a base 46 and a rear reduced height extension 48 extending rearwardly from the base 46.

Figure 8:
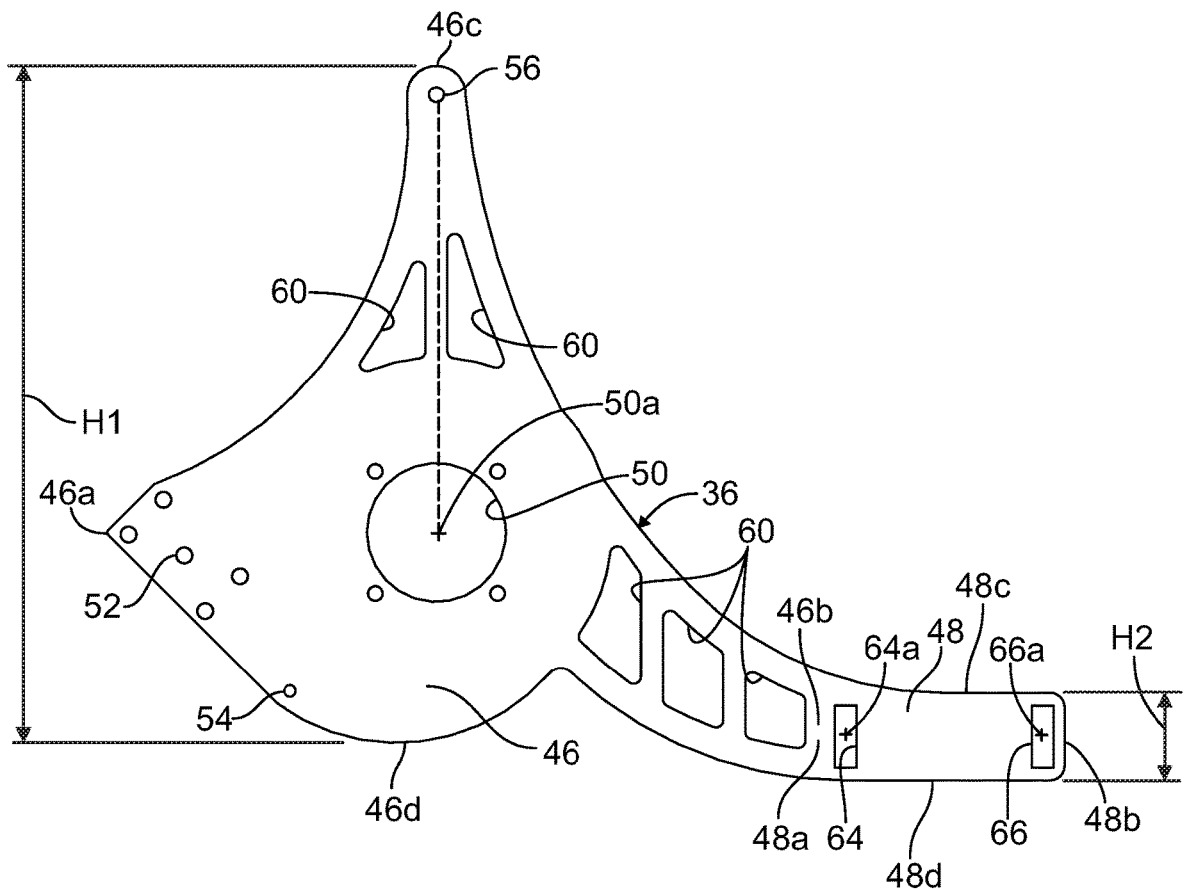
FIG. 8 depicts a side elevation views of a frame of the portable drill puller.

As best shown in FIG. 8, the base 46 has a front end 46a, a rear end 46b, an upper end 46c and a lower end 46d. The height H1 of the base 46 is defined between the upper and lower ends 46c, 46d. A gearbox mounting opening 50 is provided through the base 46. A boom retaining opening 52 is provided proximate to the front end 46a, forwardly of the gearbox mounting opening 50, and horizontally below a center 50a of the gearbox mounting opening 50 when viewed in the orientation of FIG. 8. A monopod mount aperture 54 is provided proximate to the lower end 46d, forwardly of the gearbox mounting opening 50, and horizontally below the gearbox mounting opening 50 and the boom retaining opening 52 when viewed in the orientation of FIG. 8. A handle mounting aperture 56 is provided proximate to the upper end 46c, and is vertically aligned with the center 50a of the gearbox mounting opening 50 when viewed in the orientation of FIG. 8. The boom retaining opening 52 is radially inwardly of the handle mounting aperture 56 when measured from the center 50a. A plurality of weight reducing apertures 60 are provided through the base 46 to reduce the weight of the frame 36.

The rear reduced height extension 48 extends from the rear end 46b of the base 46 and is horizontally below the gearbox mounting opening 50. The extension 48 has a front end 48a which is integrally formed with the rear end 46b of the base 46, a rear end 48b, an upper end 48c and a lower end 48d. The height H2 of the extension 48 is defined between the upper and lower ends 48c, 48d. The height H2 is substantially less than the height H1. In an embodiment, the upper end 46c is radially inwardly of the rear end 48b when measured from the center 50a. Front and rear spaced apart strap mounting apertures 64, 66 are provided through the extension 48. The front strap mounting aperture 64 is proximate to the front end 48a of the extension 48, and the rear strap mounting aperture 66 is proximate to the rear end 48b of the extension 48. In an embodiment, a center 64a, 66a of each strap mounting aperture 64, 66 is radially outwardly from the center 50a of the gearbox mounting opening 59, but the centers 64a, 66a are horizontally aligned with each other when viewed in the orientation of FIG. 8. In some embodiments, the rear strap mounting aperture 66 is open to the rear end 48b of the frame 36, see FIG. 29.

In some embodiments, the base 46 may generally mimic a triangle-shape with the boom retaining opening 52 forming one of the vertices, the handle mounting aperture 56 forming one of the vertices, and the junction of the rear end 46b of the base 46 and the front end 48a of the extension 48 forming one of the vertices.

The handle 38 is attached at the handle mounting aperture 56 and extends outwardly from the second surface 36b of the frame 36. In an embodiment, the handle 38 extends perpendicularly from the frame 36. The handle 38 provides a cylindrical gripping surface 68 for an operator's hand. In an embodiment, the handle 38 includes a ball 70 at the end of the gripping surface 68 to provide a tactile feel for the operator's hand to know where to properly grip the handle 38.

Figure 29:
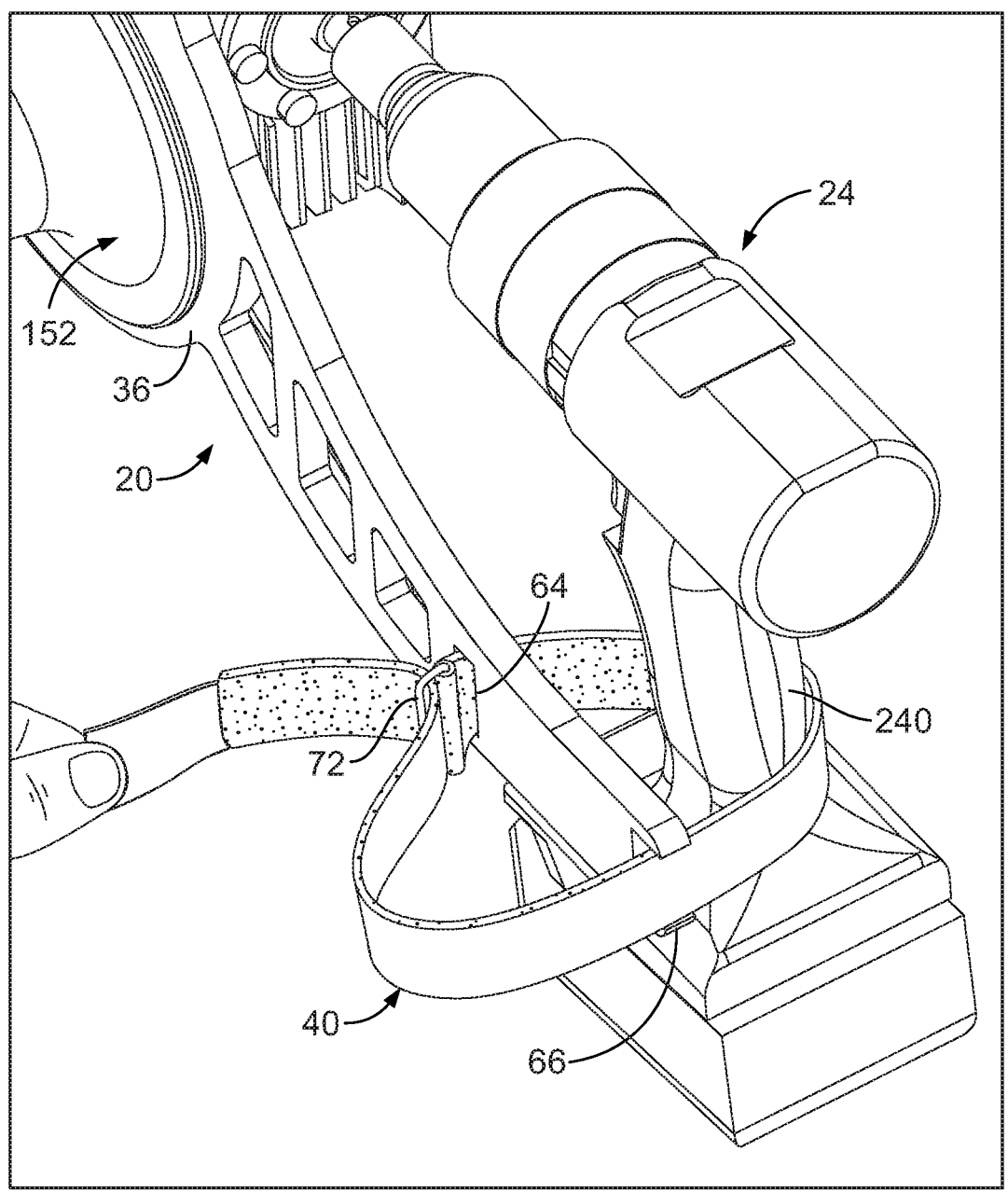
FIG. 29 depicts a partial perspective view of the portable drill puller having a conventional drill attached thereto.

The drill mounting strap 40 is formed of a flexible material which has hook and loop-type fasteners thereon, which is commonly known under the trademark VELCRO. In an embodiment as shown in FIG. 1, the rear strap mounting aperture 66 is not open to the rear end 48b, and the strap 40 has a first end suitably anchored to the frame 36 at the front strap mounting aperture 64 and a second end which loops through the rear strap mounting aperture 66 and around the rear end 48b so that the strap 40 can be fastened to itself. The strap 40 may further have a metal buckle to attach the free end of the strap 40 to the other portion of the strap 40. In use, a handle 240 of the hand drill 24 is positioned proximate to the first surface 36a of the frame 36 at the extension 48. The strap 40 is then encircled around a lower portion of the handle 240 of the hand drill 24, through the rear strap mounting aperture 66, and through the buckle 72 and secured to itself by the hook and loop-type fasteners thereon. Since the extension 48 has a reduced height H2 relative to the height H1 of the base 46, the operator's hand can easily grip an upper portion of the handle 240 in use. In an embodiment as shown in FIG. 29, the rear strap mounting aperture 66 is not open to the rear end 48b, and the strap 40 has a buckle 72 at an end thereof. The strap 40 is inserted through the front strap mounting aperture 64 and the buckle 72 cannot pass therethrough. In use, a handle 240 of the hand drill 24 is positioned proximate to the first surface 36a of the frame 36 at the extension 48. The strap 40 is then encircled around a lower portion of the handle 240 of the hand drill 24, through the rear strap mounting aperture 66, and through the buckle 72 and secured to itself by hook and loop-type fasteners thereon, which is commonly known under the trademark VELCRO. Since the extension 48 has a reduced height H2 relative to the height H1 of the base 46, the operator's hand can easily grip an upper portion of the handle 240 of the hand drill 24 in use.

Figure 10:
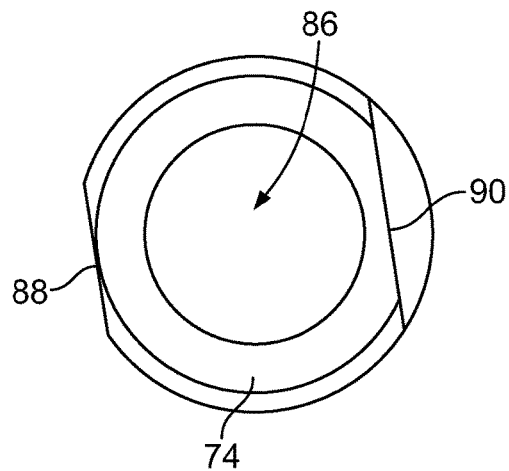
FIG. 10 depicts a top plan view of a conduit receiving wall of the portable drill puller.
Figure 9:
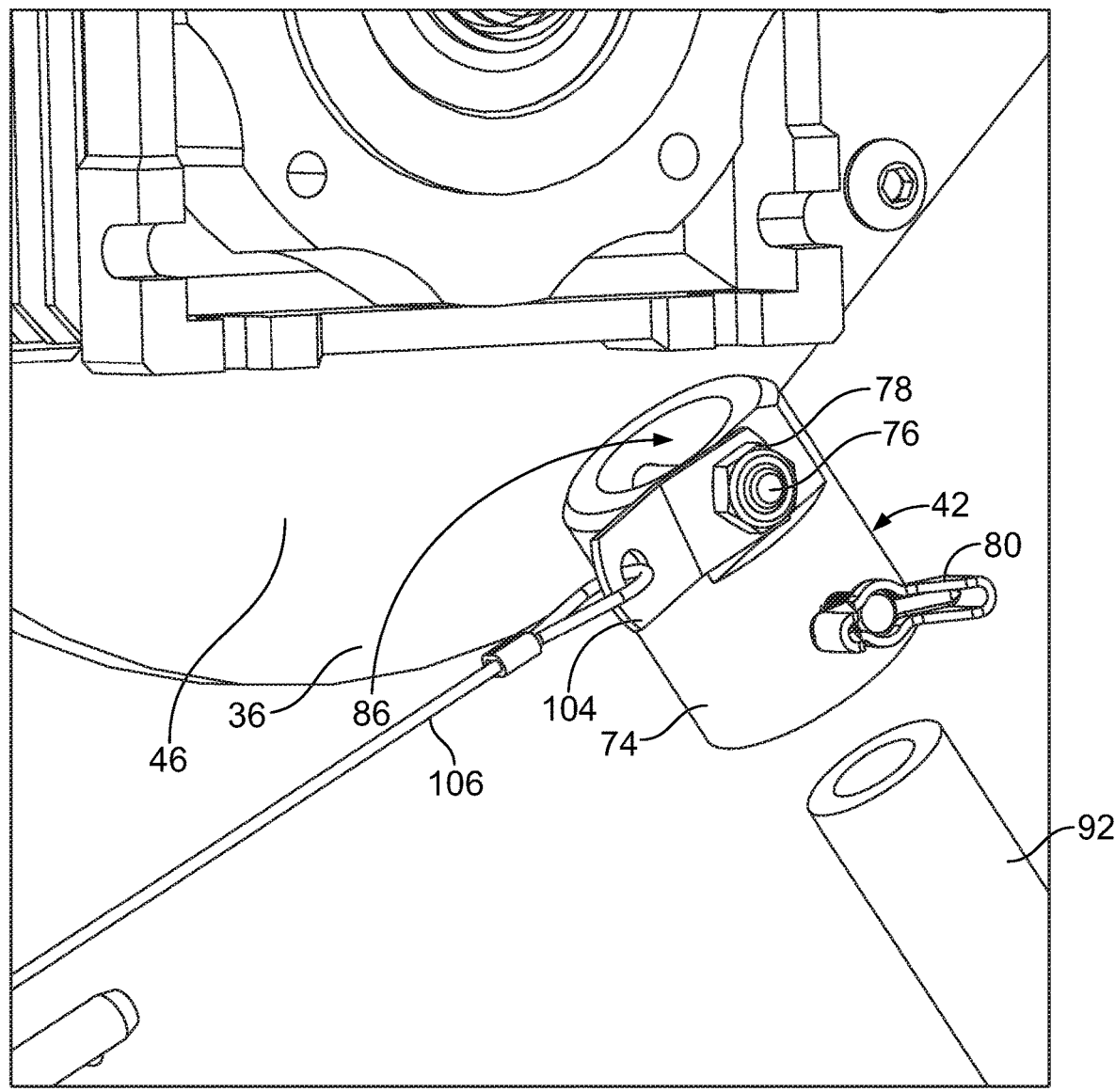
FIG. 9 depicts a partial perspective view of the portable drill puller and a separate conduit.

As shown in FIGS. 3, 9 and 10, the monopod mount 42 includes a conduit receiving wall 74, a pivot pin 76, a nut 78, and a thumb screw 80.

The conduit receiving wall 74 is generally cylindrical and has a central passageway 86 therethrough which extends from a top end 74a thereof to a bottom end 74b thereof. The outer surface of the conduit receiving wall 74 has a first flat surface 88 which extends from the top end 74a to the bottom end 74b, and a second flat surface 90 which is diametrically opposed from the first flat surface 88 and extends from the top end 74a toward the bottom end 74b. A pair of aligned apertures are provided through the surfaces 88, 90 proximate to the top end 74a to receive the pivot pin 76 therethrough. The conduit receiving wall 74 may be formed of a tube, and may be formed of aluminum.

The conduit receiving wall 74 is pivotally attached to the base 46 by the pivot pin 76 and the nut 78. The pivot pin 76 may be in the form of a headed fastener having a threaded shaft. The pivot pin 76 extends though the aligned apertures in the surfaces 88, 90, and through the monopod mount aperture 54. The head of the pivot pin 76 seats against the second surface 36b of the frame 36. The pivot pin 76 is positioned at an angle $\alpha$, see FIG. 3, relative to a line extending from the center 50a of the gearbox mounting opening 50 to the pivot pin 76 and a horizontal line extending though the center 50a of the gearbox mounting opening 50, when viewed in the orientation of FIG. 8. The angle $\alpha$ is less than 90 degrees. The nut 78 is attached to the free end of the pivot pin 76 and tightened against the conduit receiving wall 74 to secure the conduit receiving wall 74 and the pivot pin 76 together, while still allowing rotation of the conduit receiving wall 74 relative to the frame 36.

The thumb screw 80 extends through an aperture in the conduit receiving wall 74 and has an end which extends into the passageway 86. After a piece of conduit 92 is cut to a desired length and inserted into the passageway 86 of the conduit receiving wall 74, the thumb screw 80 is tightened against the conduit 92 to fixedly attach the conduit 92 to the conduit receiving wall 74. The operator can balance the drill puller 20 on the piece of conduit 92 on the floor. The pivot pin 76 prevents the piece of conduit 92 from passing outwardly from the top end 74a of the conduit receiving wall 74.

As shown in FIGS. 1-5 and 11, the boom retaining assembly 44 includes a boom receiving wall 94 and a pin 96.

Figure 11:
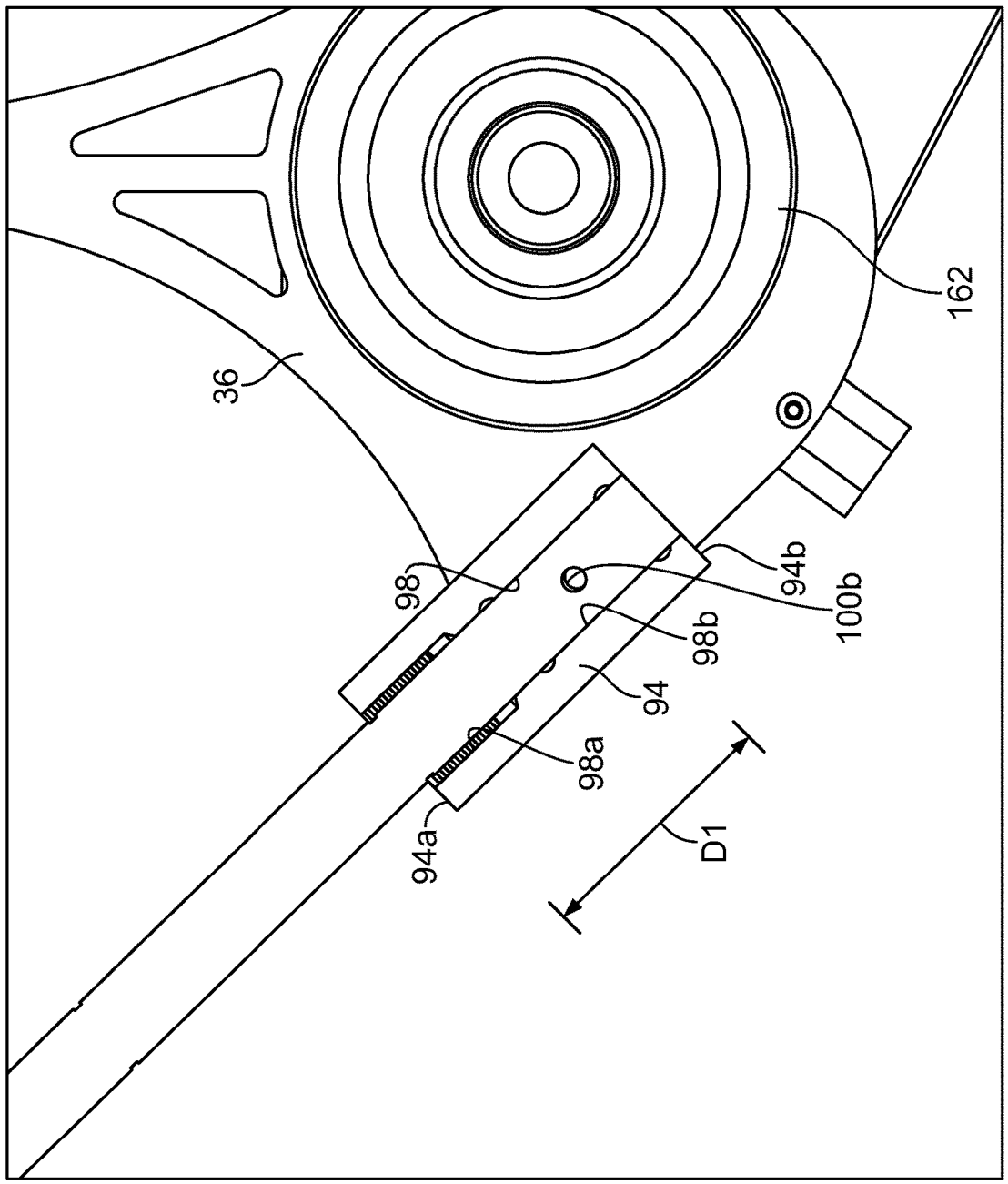
FIG. 11 depicts a partial cross-sectional view of the portable drill puller.

The boom receiving wall 94 is fixedly attached to the base 46 by suitable means, such as fasteners or welding. The boom receiving wall 94 is cylindrical and has a central passageway 98 therethrough which extends from a top end 94a thereof to a bottom end 94b thereof. As shown in FIG. 11, the central passageway 98 has a first portion 98a extending from the top end 94a to a second portion 98b which extends between the first portion 98a and the bottom end 94b. In an embodiment, the first portion 98a is threaded. The passageway 98 defines an axis which is angled at an angle $\beta$, see FIG. 2 relative to a vertical line extending through the center 50a of the gearbox mounting aperture 50 when viewed in the orientation of FIG. 8. The angle $\beta$ is less than 90 degrees when measured from above the boom receiving wall 94 when viewed in the orientation of FIG. 8. Aligned apertures 100a, 100b extend through the boom receiving wall 94 and centerlines of the apertures 100a, 100b are longitudinally spaced from the top end 94a by a distance D1. The apertures 100a, 100b align with the boom retaining opening 52 in the frame 36. The boom receiving wall 94 may be formed of an aluminum cylinder.

The pin 96 is insertable through the boom retaining opening 52 in the frame 36 and the aligned apertures 100a, 100b in the boom receiving wall 94 to affix the boom assembly 34 to the frame assembly 28 as further described herein. The pin 96 may be attached to the frame assembly 28 by a bracket 104 and a cord 106. In an embodiment, the pivot pin 76 extends through an opening in the bracket 104 and when the nut 78 is mounted on the pivot pin 76, the bracket 104 is sandwiched between the nut 78 and the conduit receiving wall 74. The cord 106 is attached to the bracket 104 by suitable means. In another embodiment, the bracket 104 is directly attached to the frame 36 by a fastener and nut.

As shown in FIG. 12, the gearbox assembly 30 includes a gearbox 108 having an integrated input shaft 110, an output shaft 112 attached to the gearbox 108, and an adaptor assembly 114 attached to the input shaft 110.

The gearbox 108 is conventional. The input shaft 110 extends outwardly from a housing 116 which houses conventional internal components. The housing 116 may be formed of aluminum, may be square, and may have ridges and fins. The housing 116 has a hollow bore 118 through which the output shaft 112 extends such that the output shaft 112 is connected to the internal components of the gearbox 108. The housing 116 is affixed to the first surface 36a of the frame 36 by suitable means, such as screws. The input shaft 110 and the output shaft 112 are at 90 degrees relative to each other. The input shaft 110 is parallel to the first surface 36a of the frame 36.

The input shaft 110 is generally cylindrical and extends outwardly from the housing 116 to a free end 110a. A keyway 120 is formed in the outer surface of the input shaft 110 and extends from the free end 110a toward the housing 116.

The output shaft 112 is an elongated cylindrical shaft having first and second ends 112a, 112b. An extending portion 122, which is spaced from the first end 112a, extends outwardly from the output shaft 112 and divides the output shaft 112 into a first part 124 and a second part 126. The first part 124 is inserted in the hollow bore 118 of the gearbox 108 and connects with the internal components in the gearbox 108. The second part 126 extends through the gearbox mounting opening 50 in the frame 36. An outer surface of the second part 126 is unthreaded. When the gearbox assembly 30 is attached to the frame 36 and the output shaft 112 is attached to the gearbox 108, the extending portion 122 is positioned in the gearbox mounting opening 50 and abuts against the housing 116. A through-bore 128 is provided through the second part 126 and is spaced from the second end 112b. The second end 112b has a threaded blind bore 130 therein which extends from the second end 112b toward the first end 112a, but is not in communication with the through-bore 128. In an embodiment, the through-bore 128 is perpendicular to the threaded blind bore 130. The output shaft 112 may be formed of steel. In an embodiment, the extending portion 122 is a flange which is integrally formed with the output shaft 112. In an embodiment, the extending portion 122 is a retaining ring that seats within a retaining ring groove in the output shaft 112.

The adaptor assembly 114 enables the hand drill 24 and the input shaft 110 to be connected together. The adaptor assembly 114 includes an input shaft adaptor 132 and an attachment 134 to connect the input shaft adaptor 132 to the input shaft 110.

Figure 13:
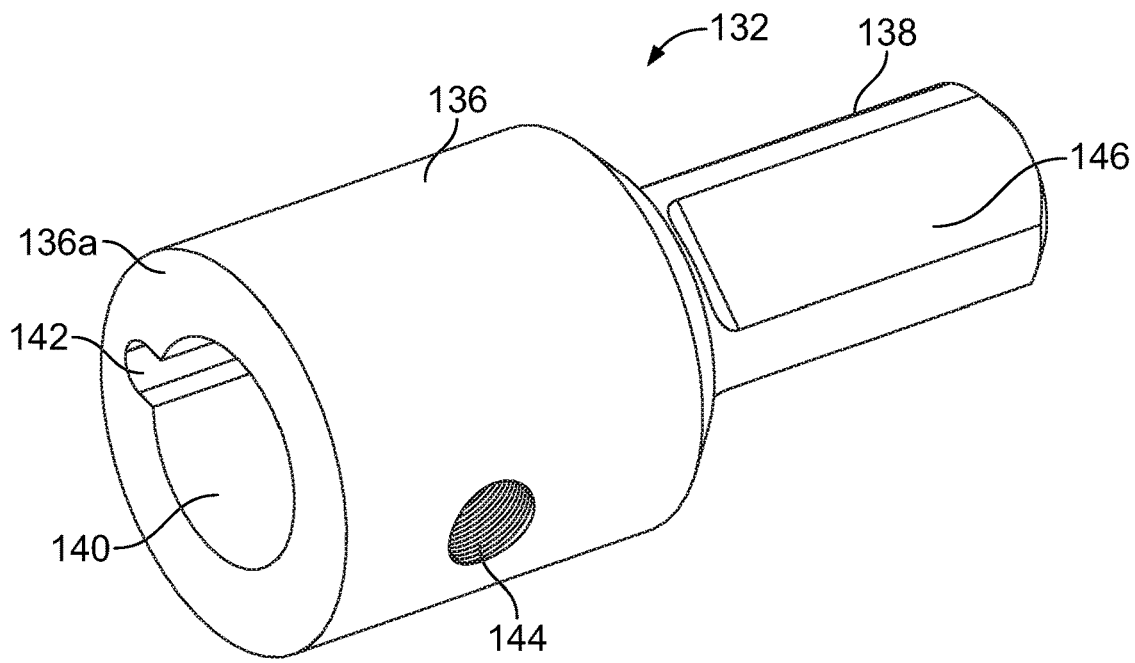
FIGS. 13 and 14 depict a perspective views of an input shaft adaptor of the portable drill puller.
Figure 14:
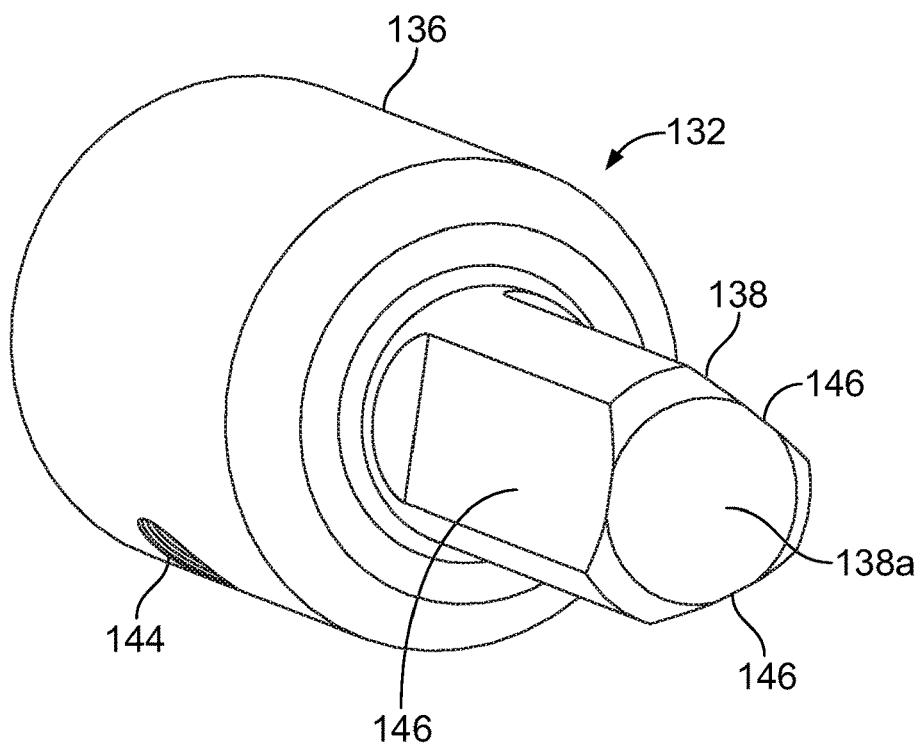

As shown in FIGS. 13 and 14, the input shaft adaptor 132 has a first part 136 which connected to the input shaft 110 and a second part 138 which connects to a chuck of the hand drill 24. The first part 136 has a blind bore 140 extending from a first end 136a thereof toward the second part 138. A keyway 142 extends from the first end 136a and is in communication with the bore 140 along its length. A threaded passageway 144 extends from the outer surface of the first part 136 and is in communication with the blind bore 140. In an embodiment, the threaded passageway 144 is perpendicular to the axis of the blind bore 140. The second part 138 has an outer diameter which is less than the outer diameter of the first part 136. The second part 138 has three flat surfaces 146 which extend from the first part 136 to a free end 138a of the second part 138.

The input shaft 110 seats within the blind bore 140 of the input shaft adaptor 132. The keyways 120, 142 align with each other to form a passageway.

In an embodiment, the attachment 134 includes a shear key 148 and a thumb screw 150. The shear key 148 seats within the aligned keyways 120, 142. The thumb screw 150 threadedly engages in the threaded passageway 144 and engages with the outer surface of the input shaft 110.

The chuck of the hand drill 24 is engaged with the flat surfaces 146 on the input shaft adaptor 132 and tightened thereon in a conventional manner.

The shear key 148 limits the maximum pull force the user can produce with the hand drill 24, and further prevents the input shaft adaptor 132 from rotating relative to the input shaft 110 when attached to, and rotated by the hand drill 24. The thumb screw 150 prevents sliding of the input shaft adaptor 132 relative to the input shaft 110 and prevents the input shaft adaptor 132 from rotating relative to the input shaft 110 when attached to, and rotated by the hand drill 24.

The adaptor assembly 114 transfers the torque of the hand drill 24 to the input shaft 110. In addition, the adaptor assembly 114 is a designed replaceable failure mechanism to protect the integrated input shaft 110 of the gearbox 108.

As shown in FIGS. 15-22, embodiments of the capstan assembly 32 include a capstan 152, an upstanding end wall 154, a knob 156, a nut 158 and a drive pin 160.

The capstan 152 includes an upstanding end flange 162 and a body 164 extending therefrom. The capstan 152 is mounted on the output shaft 112 proximate to the second surface 36b of the frame 36. The drive pin 160 connects the capstan 152 to the output shaft 112 via the through-bore 128. The capstan 152 may be formed of aluminum.

The end flange 162 is ring-like such that a central aperture 166 is defined. The end flange 162 has opposite planar surfaces 162a, 162b.

The body 164 is ring-like such that a central unthreaded passageway 168 extends from a first end 164a of the body 164 to a second free end 164b thereof. The central passageway 168 defines an axis 170. The outer perimeter of the body 164, when viewed in cross-section, has a first radiused wall portion 172 which extends from the surface 162b of the end flange 162, and a second angled wall portion 174 which extends from the first radiused wall portion 172 to the second free end 164b. The angled wall portion 174 extends at a constant angle μ relative to the axis 170, see FIG. 17. The angle μ may be, for example, 5 degrees to 15 degrees. The largest diameter of the angled wall portion 174 is at the surface 162b of the end flange 162 and the smallest diameter of the angled wall portion 174 is at the second end 164b. In an embodiment, the first surface 162a and the first end 164a align with each other. In an embodiment, the central aperture 166 is eliminated and the end flange 162 and the body 164 are continuous at the first surface 162a and the first end 164a. The angled wall portion 174 forms a cone-shape.

Figure 17:
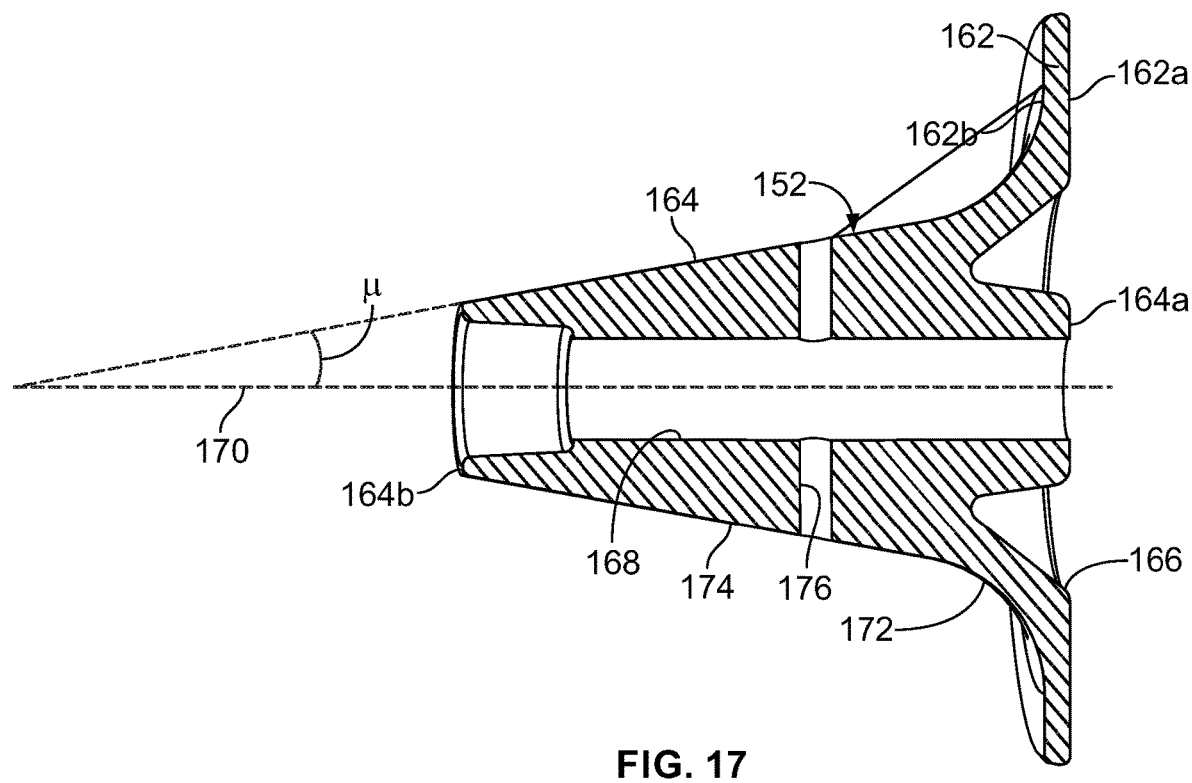
FIGS. 17 and 18 depict cross-sectional views of the capstan.
Figure 18:
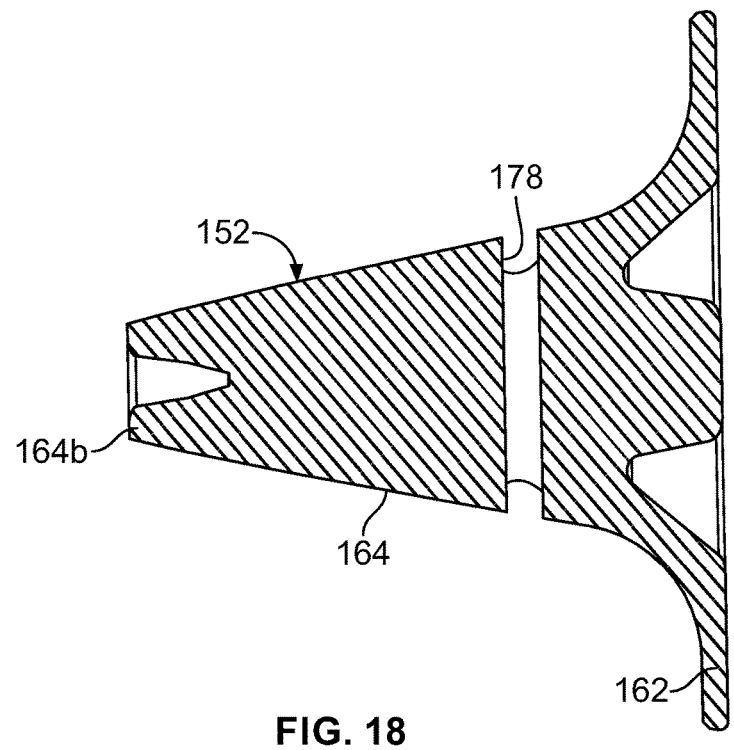

An unthreaded through-bore 176, see FIG. 17, is provided through the body 164 at a position spaced between the first and second ends 164a, 164b. The through-bore 176 is bisected by the central passageway 168. In an embodiment, the through-bore 176 is perpendicular to the central passageway 168. An unthreaded through passageway 178, see FIG. 18, is provided through the body 164 at a position spaced between the first and second ends 164a, 164b. The through passageway 178 is spaced from the central passageway 168 and the through-bore 176. The through-bore 176 and the through passageway 178 may be parallel to each other.

Figure 16:
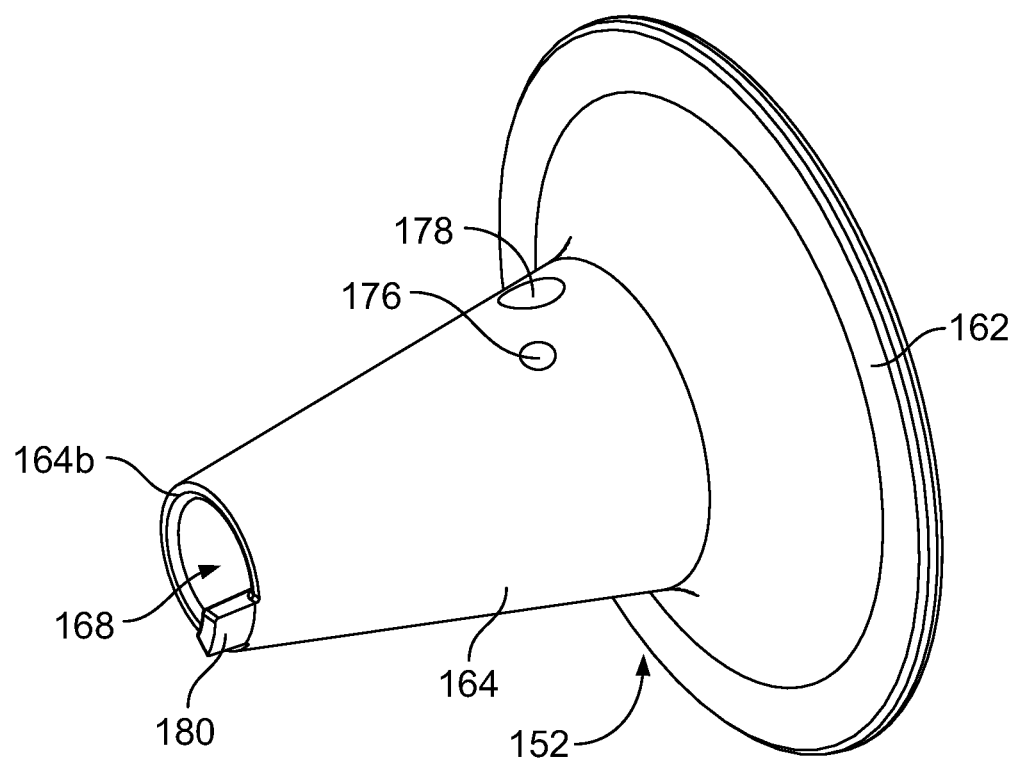
FIG. 16 depicts a perspective view of a capstan of the portable drill puller.

A tab 180, see FIG. 16, extends outwardly from the second end 164b of the body 164 and ends at a free end. In an embodiment, the tab 180 is curved along the same radius that the second end 164b of the body 164 is curved.

The second part 126 of the output shaft 112 is inserted through the central passageway 168 of the body 164. The central passageway 168 of the body 164 is sized to be slightly larger than the first part 124 of the output shaft 112. The through-bore 128 through the output shaft 112 is aligned with the through-bore 176 and the drive pin 160 is seated within the aligned bores 128, 176 to secure the capstan 152 and the output shaft 112 together. The capstan 152 accordingly rotates with the output shaft 112 when the output shaft 112 is driven by the gearbox 108. The torque of the gearbox 108 is transferred to the capstan 152 by the drive pin 160.

Figure 15:
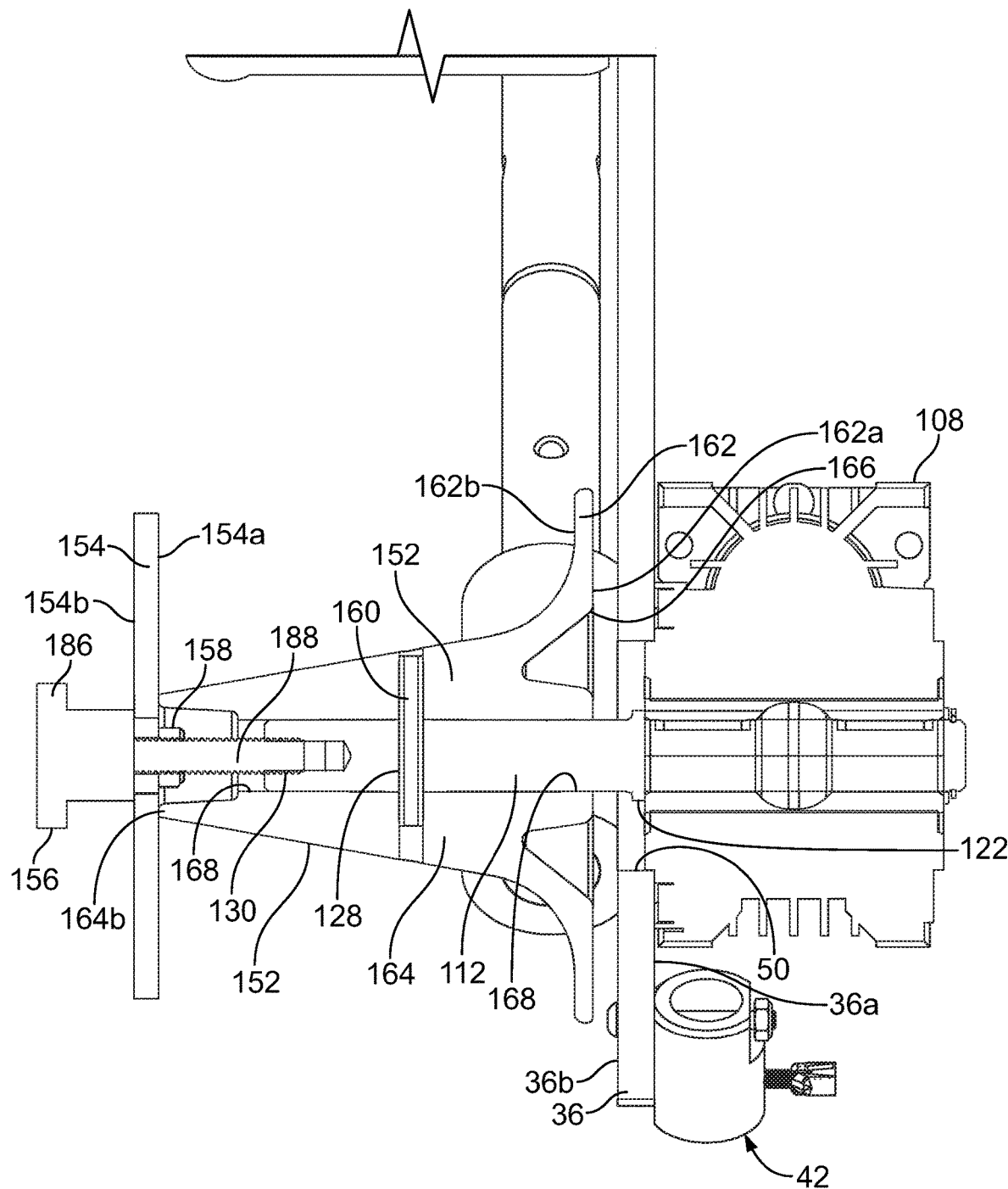
FIG. 15 depicts a cross-sectional view of the portable drill puller.
Figure 19:
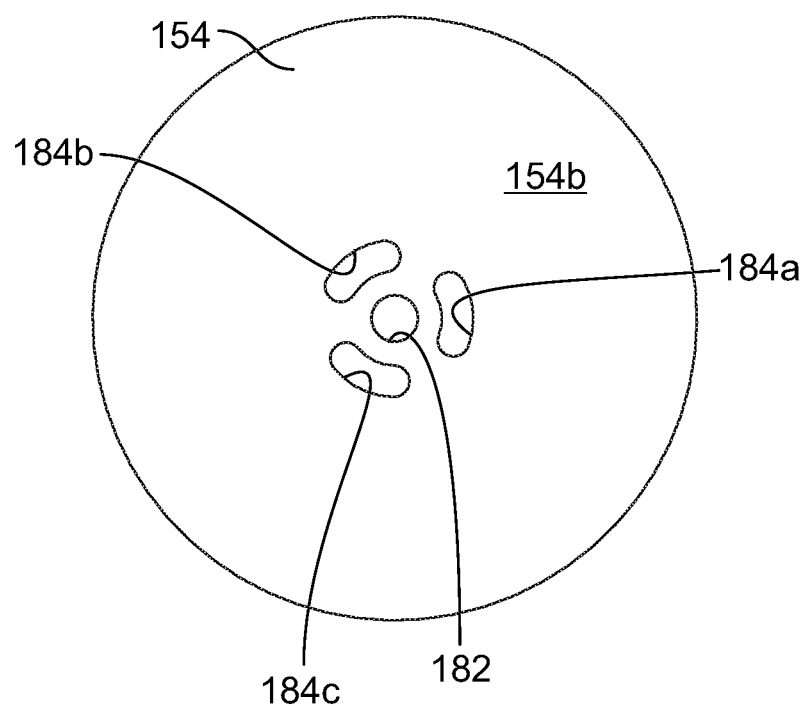
FIG. 19 depicts a side elevation view of an embodiment of an end wall of the portable drill puller.

As best shown in FIGS. 15 and 19, in an embodiment, the end wall 154 has planar first and second surfaces 154a, 154b and a central unthreaded aperture 182 extending therethrough. The outer diameter of the aperture 182 is smaller than the outer diameter of the body 164 at the second surface 162b. The end wall 154 has a plurality of elongated slots 184a, 184b, 184c therethrough which are spaced apart from each other, surround the central aperture 182, and are spaced from the central aperture 182. Each elongated slot 184a, 184b, 184c is curved along a radius and the elongated slots 184a, 184b, 184c fall along the same imaginary circle.

Figure 20:
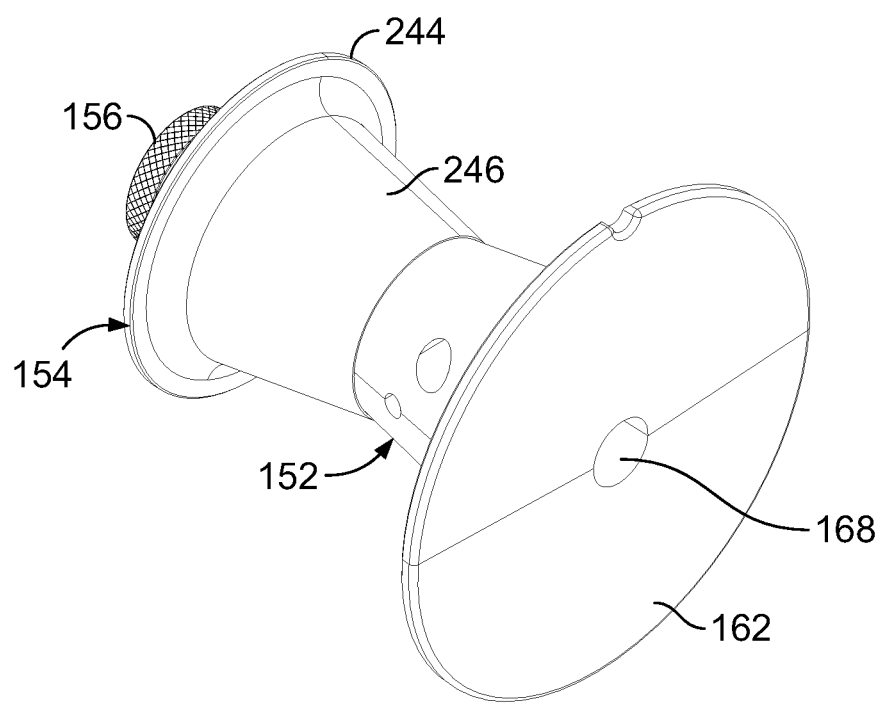
FIG. 20 depicts a perspective view of the capstan and another embodiment of an end wall of the portable drill puller.
Figure 21:
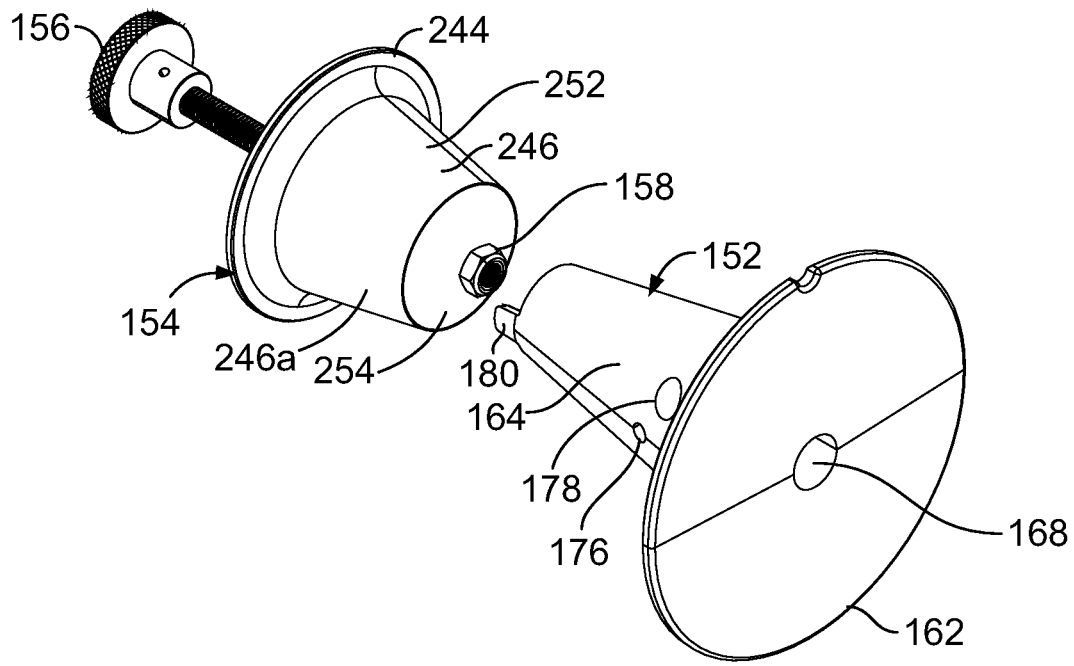
FIG. 21 depicts an exploded perspective view of the capstan and end wall of FIG. 20.
Figure 22:
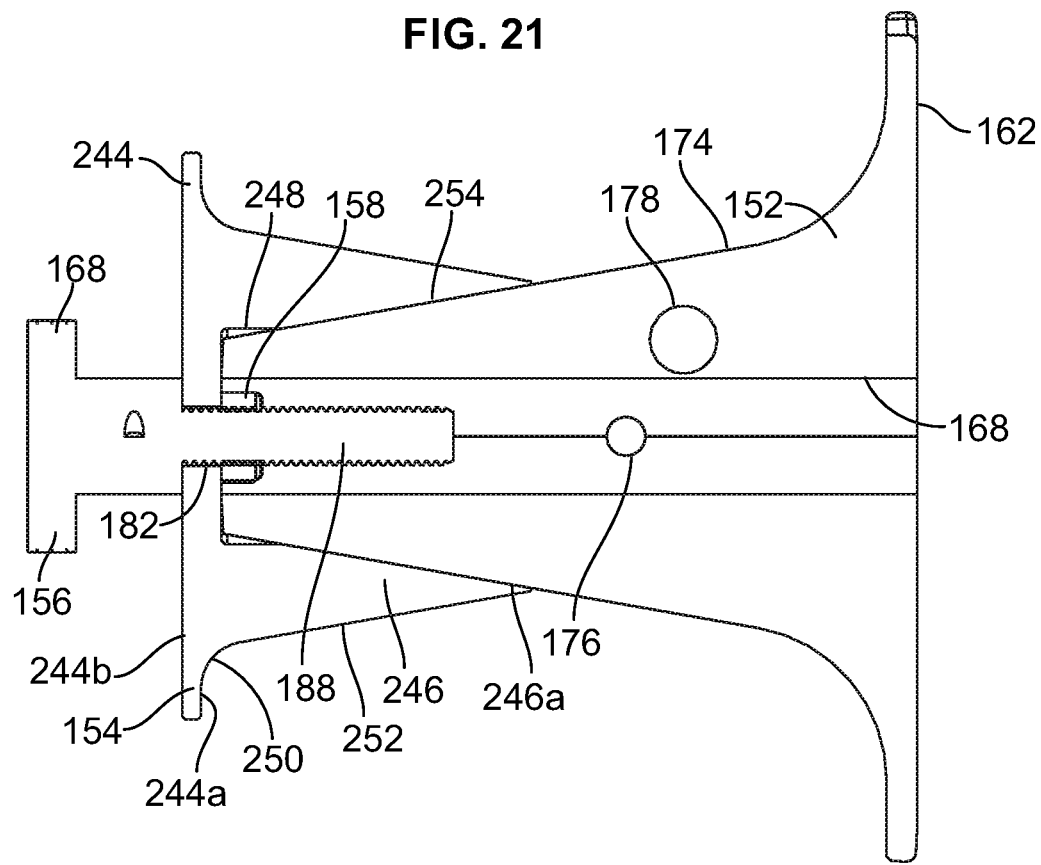
FIG. 22 depicts a cross-sectional view of the capstan and end wall of FIG. 20.

As best shown in FIGS. 20-22, in an embodiment, the end wall 154 has an end wall portion 244 having planar first and second surfaces 244a, 244b, a central unthreaded aperture 182 extending through the end wall portion 244, an extension wall portion 246 extending from the first surface 244a, and a central unthreaded passageway 248 extending through the extension wall portion 246. The passageway 248 extends from the aperture 182 and central axes of the aperture 182 and the passageway 248 are aligned.

The outer perimeter of the extension wall portion 246, when viewed in cross-section, has a first radiused wall portion 250 which extends from the surface 244a of the end wall portion 244, and a second wall portion 252 which extends from the first radiused wall portion 244 to a free end 246a of the extension wall portion 246. The second wall portion 252 is parallel to the central axis of the extension wall portion 246 or extends at a constant angle, which may be, for example, greater than 0 degrees to 15 degrees, relative to the central axis of the extension wall portion 246. The largest diameter of the second wall portion 252 is at the surface 244a of the end wall portion 244 and the smallest diameter of the second wall portion 252 is at the free end 246a.

At least a portion of the unthreaded passageway 248 of the extension wall portion 246, when viewed in cross-section, has an angled wall portion 254 which extends from the free end 246a toward the end wall portion 244. The second wall portion 252 extends at a constant angle relative to the central axis of the extension wall portion 246 and mirrors the angle of the angled wall portion 174 of the body 164. The largest diameter of the second wall portion 252 is at the surface 244a of the end wall portion 244 and the smallest diameter of the second wall portion 252 is at the end wall portion 244. The second wall portion 252 forms a cone-shape.

Identical to that of the end wall 154 as shown in FIG. 19, the end wall portion 244 has a plurality of elongated slots 184a, 184b, 184c (not shown in FIGS. 20-22) therethrough which are spaced apart from each other, surround the central aperture 182, and are spaced from the central aperture 182. Each elongated slot 184a, 184b, 184c is curved along a radius and the elongated slots 184a, 184b, 184c fall along the same imaginary circle.

The knob 156 has a handle portion 186 and a threaded shaft 188 extending therefrom. The handle portion 186 is larger than the central aperture 182 of the end wall 154. A gripping surface, such as knurling, is provided on the handle portion 186 which an operator can grasp to rotate the knob 156.

With regard to the embodiment shown in FIGS. 15 and 19, the end flange 162 is proximate to the second surface 36b of the frame 36. In use, the threaded shaft 188 extends through the unthreaded aperture 182 of the end wall 154, and the nut 158 is attached to the threaded shaft 188 and is tightened to abut against first surface 154a of the end wall 154. Thereafter, to attach the end wall 154 to the capstan 152 and the output shaft 112, the threaded shaft 188 is threadedly engaged with the threaded blind bore 130 of the output shaft 112. As the threaded shaft 188 is being threadedly engaged with the threaded blind bore 130, the threaded shaft 188 and the nut 158 rotate relative to the end wall 154. When the end wall 154 is proximate to the free end of the tab 180, the end wall 154 is rotated around the threaded shaft 188 and relative to the nut 158 until one of the elongated slots, for example slot 184a, in the end wall 154 is over the tab 180. Thereafter, the knob 156 is continued to be rotated relative to the end wall 154 to further seat the threaded shaft 188 in the output shaft 112, to move the nut 158 into the passageway 168 of the capstan 152. During this movement, the end wall 154 translates toward the output shaft 112. Once the first surface 154a of the end wall 154 abuts against the second end 164b of the body 164 of the capstan 152, the assembly is complete.

With regard to the embodiment shown in FIGS. 20-22, the end flange 162 is proximate to the second surface 36b of the frame 36. In use, the threaded shaft 188 extends through the unthreaded aperture 182 of the end wall portion 244 and into the passageway 248 of the extension wall portion 246, and the nut 158 is attached to the threaded shaft 188 and is tightened to abut against first surface 244a of the end wall portion 244. Thereafter, to attach the end wall 154 to the capstan 152 and the output shaft 112, the threaded shaft 188 is threadedly engaged with the threaded blind bore 130 of the output shaft 112 and the angled wall portion 174 of the body 164 seats within the angled wall portion 254 of the passageway 248. As the threaded shaft 188 is being threadedly engaged with the threaded blind bore 130, the threaded shaft 188 and the nut 158 rotate relative to the end wall 154. When the end wall portion 244 is proximate to the free end of the tab 180, the end wall 154 is rotated around the threaded shaft 188 and relative to the nut 158 until one of the elongated slots, for example slot 184a, in the end wall portion 244 is over the tab 180. Thereafter, the knob 156 is continued to be rotated relative to the end wall 154 to further seat the threaded shaft 188 in the output shaft 112, to move the nut 158 into the passageway 168 of the capstan 152 and to move the angled wall portion 174 of the body 164 toward the angled wall portion 254 of the extension wall portion 246. During this movement, the end wall 154 translates toward the output shaft 112. Once the angled wall portion 174 of the body 164 abuts against the angled wall portion 254 of the extension wall portion 246, the assembly is complete. The extension wall portion 246 overlays a section of the angled wall portion 174 of the body 164.

Once assembled, the end wall 154 rotates with the capstan 152 and the output shaft 112 when the hand drill 24 is activated. Since the tab 180 on the capstan 152 is engaged in one of the slots, for example slot 184a, in the end wall 154, the knob 156 is prevented from backing out of the output shaft 112 during operation.

An end of the pull string 22 can be attached to the capstan 152 by passing the pull string 22 through the through passageway 178 and either tying the end of the pull string 22 into a knot, or looping a wind of the pull string 22 over the free end of the pull string 22. When the pull string 22 is spooled onto the body 164 of the capstan 152 and the end wall 154 of FIG. 19 during a pulling operation, the pull string 22 is wound around the body 164 between the end flange 162 and the end wall 154, but cannot slide off of the body 164 because the end wall 154 prevents the pull string 22 from falling off of the capstan 152. When the pull string 22 is spooled onto the body 164 of the capstan 152 and end wall 154 of FIGS. 20-22 during a pulling operation, the pull string 22 is wound around the body 164 and the extension wall portion 246 between the end flange 162 and the end wall portion 244, but cannot slide off of the body 164 because the end wall 154 prevents the pull string 22 from falling off of the capstan 152. To remove the pull string 22, the knob 156 is rotated in the opposite direction until the threaded shaft 188 disengages from the threaded blind bore 130 of the output shaft 112. During this rotation, the threaded shaft 188 and nut 158 rotate relative to the end wall 154, and the end wall 154 moves outwardly away from the capstan 152 to disengage the tab 180 from the slot, for example slot 184a. After the tab 180 is released from the slot, for example slot 184a, and the threaded shaft 188 released from the threaded blind bore 130 of the output shaft 112, the end wall 154, the knob 156 and the nut 158 are removed from the capstan 152. The spooled pull string 22 is then slid off of the capstan 152. The second angled wall portion 174 of the body 164 assists in causing the spooled pull string 22 to slide off of the capstan 152. Thereafter, the end wall 154, the knob 156 and the nut 158 are then reattached to the capstan 152 as described herein for the next pulling operation.

While three elongated slots 184a, 184b, 184c are shown, it is to be understood that a single elongated slot or two elongated slots may be provided, or more than three elongated slots may be provided.

Figure 15A:
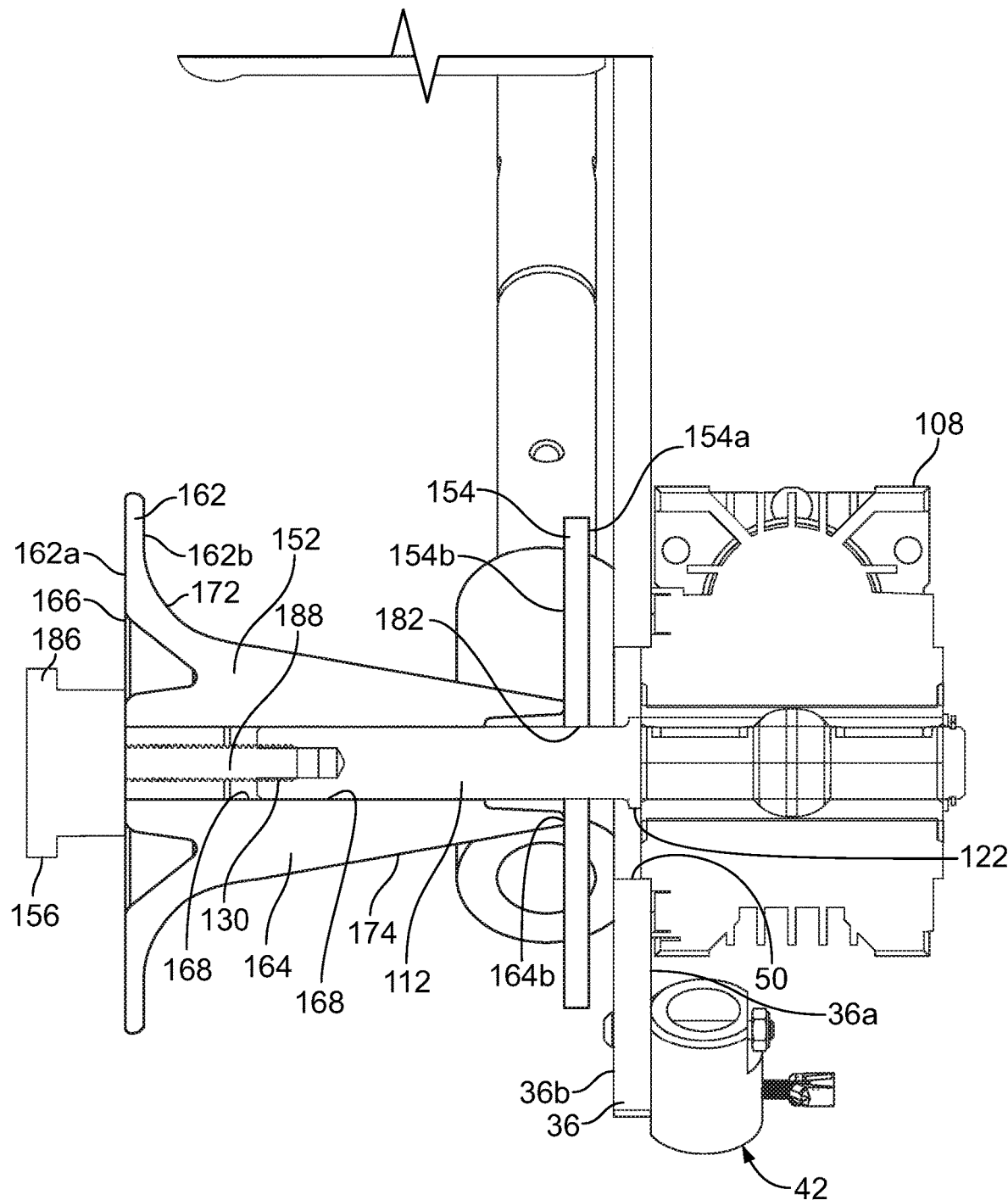
FIG. 15A depicts a cross-sectional view of an alternate embodiment of the portable drill puller.

With regard to the embodiments shown in FIGS. 15 and 19 and in FIGS. 20-22, the capstan 152 and the end wall 154 can be flipped over so that the end wall 154 is proximate to the second surface 36b of the frame 36 as shown in FIG. 15A. With this embodiment, the nut 158 is eliminated. In use, the output shaft 112 is passed through the unthreaded aperture 182 of the end wall 154 and then into the central unthreaded passageway 168 of the capstan 152. The tab 180 is aligned with one of the elongated slots (or only a single slot may be provided), for example slot 184a, in the end wall 154 and inserted therethrough. This ensure rotation of the end wall 154 with the capstan 152. The threaded shaft 188 is passed through the central unthreaded passageway 168 of the capstan 152 and is threadedly engaged with the threaded blind bore 130 of the output shaft 112. The knob 156 bears against the first surface 162a of the capstan 152 to lock the capstan 152 onto the output shaft 112. The pull string 22 is spooled onto the body 164 of the capstan 152 and the end wall 154 as described above. To remove the pull string 22, the knob 156 is rotated in the opposite direction until the threaded shaft 188 disengages from the threaded blind bore 130 of the output shaft 112 and is removed from engagement with the capstan 152. The capstan 152 can then be pulled off of the output shaft 112 and the spooled pull string 22 is then slid off of the capstan 152. The second angled wall portion 174 of the body 164 assists in causing the spooled pull string 22 to slide off of the capstan 152. Thereafter, the capstan 152 and the knob 156 are then reattached to the first surface 162a and the end wall 154 as described herein for the next pulling operation.

Figure 15B:
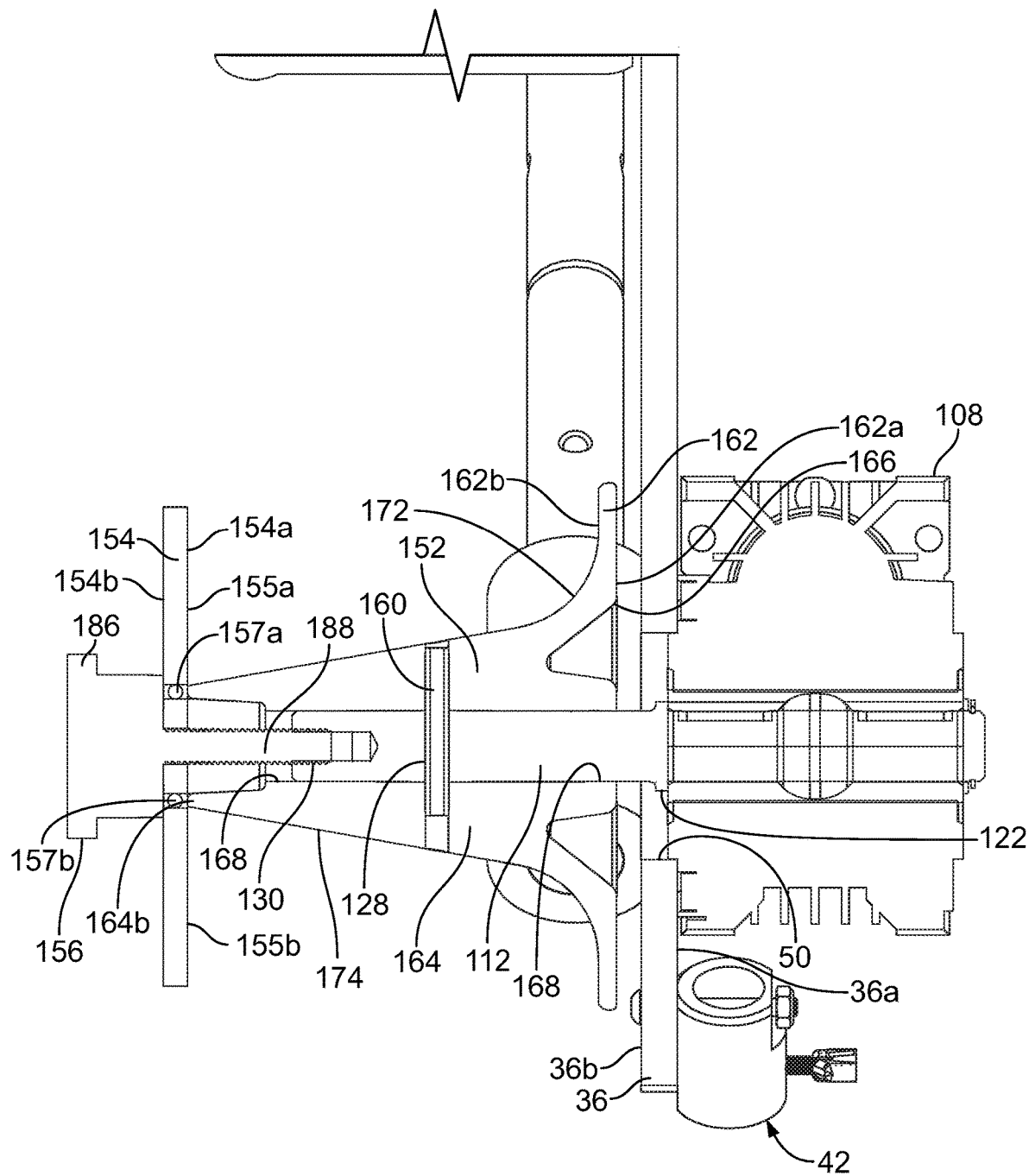
FIG. 15B depicts a cross-sectional view of yet another alternate embodiment of the portable drill puller.

FIG. 15B shows another embodiment of the end wall 155 which has a pair of upstanding wall portions 155a, 155b, each of which is pivotally connected to the second end 164b of the capstan 152 by pivot pins 157a, 157b. Each upstanding wall portion 155a, 155b can pivot from the upstanding position as shown in FIG. 15B to a position that is parallel to the axis 170 of the capstan 152. In this embodiment, the nut 158 and the tab 180 are not used. Once the capstan 152 and the end wall 155 are mounted onto the output shaft 112 with the first surface 162a proximate to the frame 36, the threaded shaft 188 is passed between the wall portions 155a, 155b, through the central unthreaded passageway 168 of the capstan 152 and is threadedly engaged with the threaded blind bore 130 of the output shaft 112. The knob 156 bears against the exterior surfaces of the wall portions 155a, 155b to lock the wall portions 155a, 155b into the upstanding position shown in FIG. 15B and to lock the capstan 152 onto the output shaft 112. The pull string 22 is spooled onto the body 164 of the capstan 152 and the end wall 155 as described above. To remove the pull string 22, the knob 156 is rotated in the opposite direction until the threaded shaft 188 disengages from the threaded blind bore 130 of the output shaft 112 and is removed from engagement with the capstan 152 and from between the wall portions 155a, 155b. The wall portions 155a, 155b are then pivoted to the position that is parallel to the axis 170 of the capstan 152. The spooled pull string 22 is then slid off of the capstan 152 and over the wall portions 155a, 155b. The second angled wall portion 174 of the body 164 assists in causing the spooled pull string 22 to slide off of the capstan 152. Thereafter, the wall portions 155a, 155b are pivoted relative to the capstan 152 back to the upstanding position shown in FIG. 15B and the knob 156 is then reattached to the output shaft 112 as described herein for the next pulling operation.

As shown in FIGS. 23-27, the boom assembly 34 seats within the boom receiving wall 94 of the boom retaining assembly 44. The boom assembly 34 includes a boom 190, and adjustable head 192, a retaining pin 194, a U-shaped bracket 196, and a single roller 198.

Figure 23:
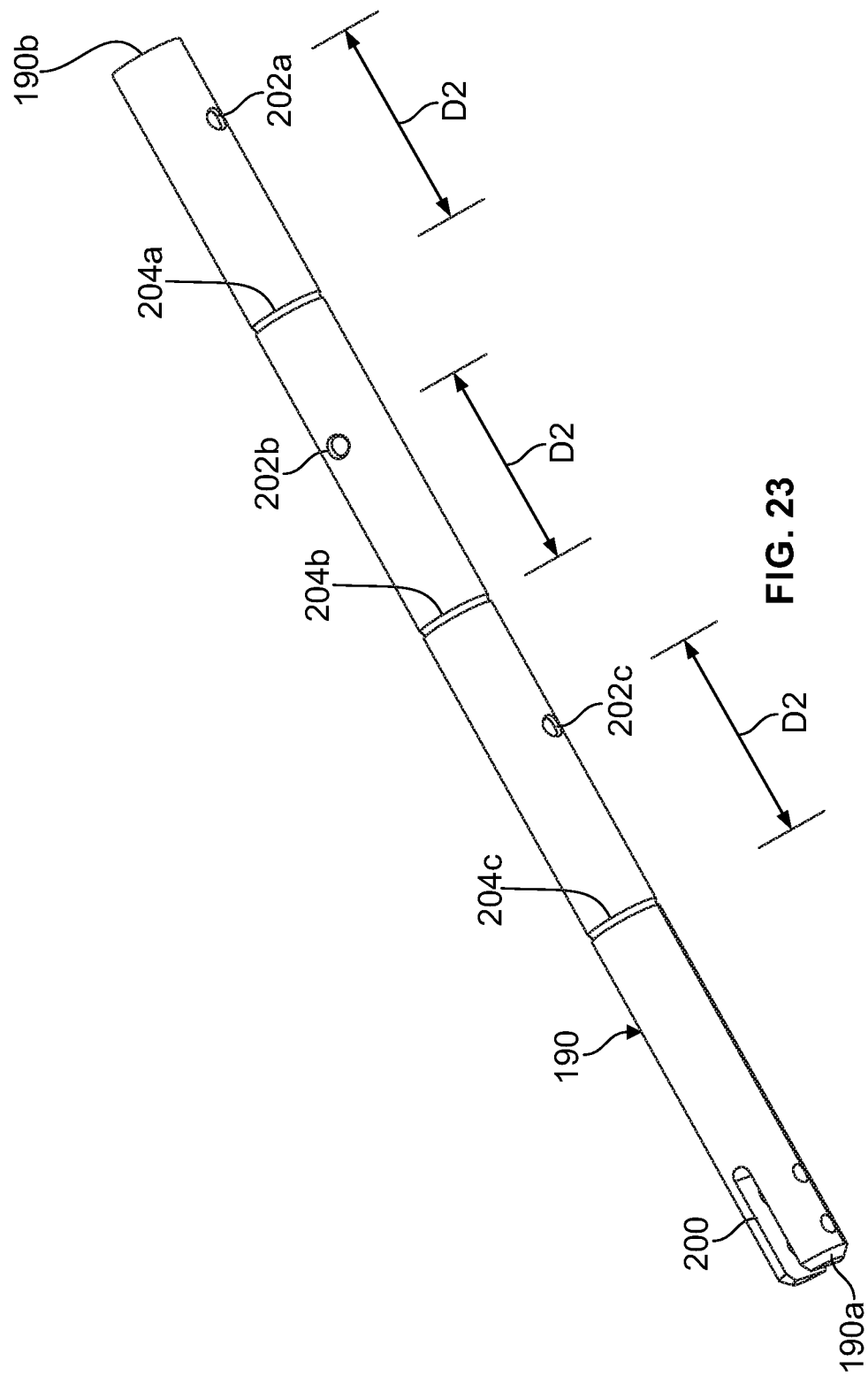
FIG. 23 depicts a perspective view of a boom of the portable drill puller.
Figure 24:
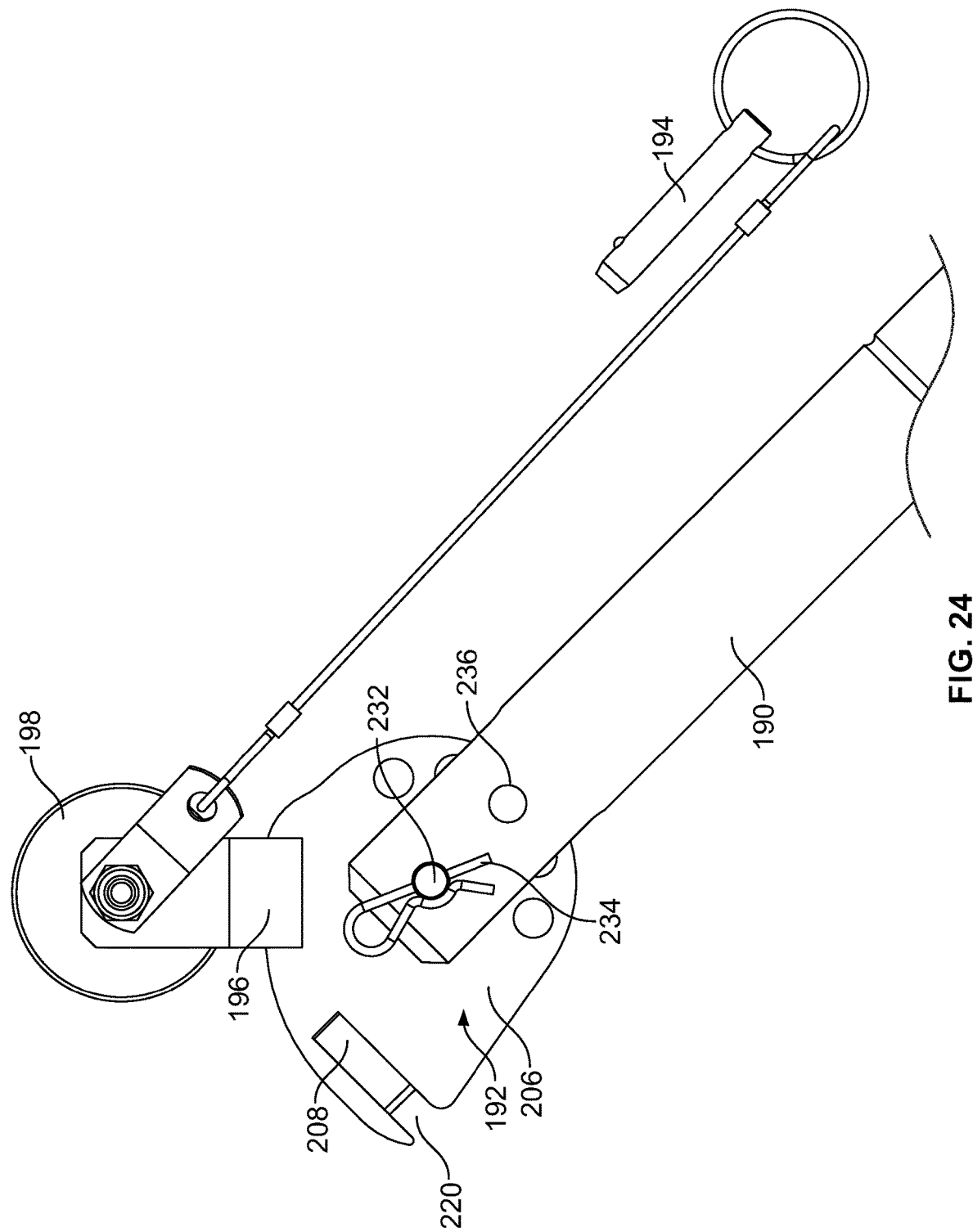
FIG. 24 depicts a partial side elevation view of the portable drill puller.

As best shown in FIG. 23, the boom 190 is an elongated cylinder having opposite upper and lower ends 190a, 190b. A slot 200 is provided in the upper end 190a which bifurcates the upper end 190a into two parts. A plurality of spaced apart passageways 202a, 202b, 202c are provided through the boom 190 transverse to the length of the boom 190. Some of the passageways may be parallel to each other, see for example passageways 202a and 202c; some of the passageways may be transverse to the other passageways, see for example passageways 202a and 202b. Indicia 204a, 204b, 204c is provided on the exterior surface of the boom 190 at spaced apart locations. A top edge of the indicia 204a is spaced from the axis of the passageway 202a at a distance D2 which is the same as the distance D1 that centerlines of the apertures 100a, 100b are longitudinally spaced from the top end 94a of the boom receiving wall 94; a top edge of the indicia 204b is spaced from the axis of the passageway 202b at the distance D2; and a top edge of the indicia 204c is spaced from the axis of the passageway 202c at the distance D2. The indicia 204a, 204b, 204c may be formed by grooves in the boom 190 or printing on the boom 190. While three passageways 202a, 202b, 202c are shown and are oriented in ninety-degree increments, only two passageways 202a, 202c may be provided.

The boom 190 seats within the passageway 98 of the boom receiving wall 94 during operation. The boom 190 is constrained axially by the pin 96 inserted through the boom retaining opening 52 in the frame 36, through the aperture 100b in the boom receiving wall 94, through one of the passageways 202a, 202b, 202c, and through the aperture 100a in the boom receiving wall 94. When the pin 96 is within passageway 202a, the top edge of the indicia 204a aligns with the top end 94a of the boom receiving wall 94. This indicates to the operator that the passageway 202a is longitudinally aligned with the apertures 100a, 100b; the operator may need to rotate the boom 190 within the boom receiving wall 94 to align the passageway 202a with the apertures 100a, 100b so that the pin 96 can be inserted. In this position, the lower end 190b of the boom 190 aligns with the bottom end 94b of the boom receiving wall 94. When the pin 96 is within passageway 202b, the top edge of the indicia 204b aligns with the top end 94a of the boom receiving wall 94. This indicates to the operator that the passageway 202b is longitudinally aligned with the apertures 100a, 100b; the operator may need to rotate the boom 190 within the boom receiving wall 94 to align the passageway 202b with the apertures 100a, 100b so that the pin 96 can be inserted. In this position, the boom 190 extends through the boom receiving wall 94 and the lower end 190b of the boom 190 is spaced downwardly from the bottom end 94b of the boom receiving wall 94. When the pin 96 is within passageway 202c, the top edge of the indicia 204c aligns with the top end 94a of the boom receiving wall 94. This indicates to the operator that the passageway 202c is longitudinally aligned with the apertures 100a, 100b; the operator may need to rotate the boom 190 within the boom receiving wall 94 to align the passageway 202c with the apertures 100a, 100b so that the pin 96 can be inserted. In this position, the boom 190 extends even further through the boom receiving wall 94 and the lower end 190b of the boom 190 is further spaced downwardly from the bottom end 94b of the boom receiving wall 94.

The head 192 is formed of a first plate 206 having opposite planar surfaces 206a, 206b, and a second plate 208 having opposite planar surfaces 208a, 208b which is perpendicular to the first plate 206.

Figure 25:
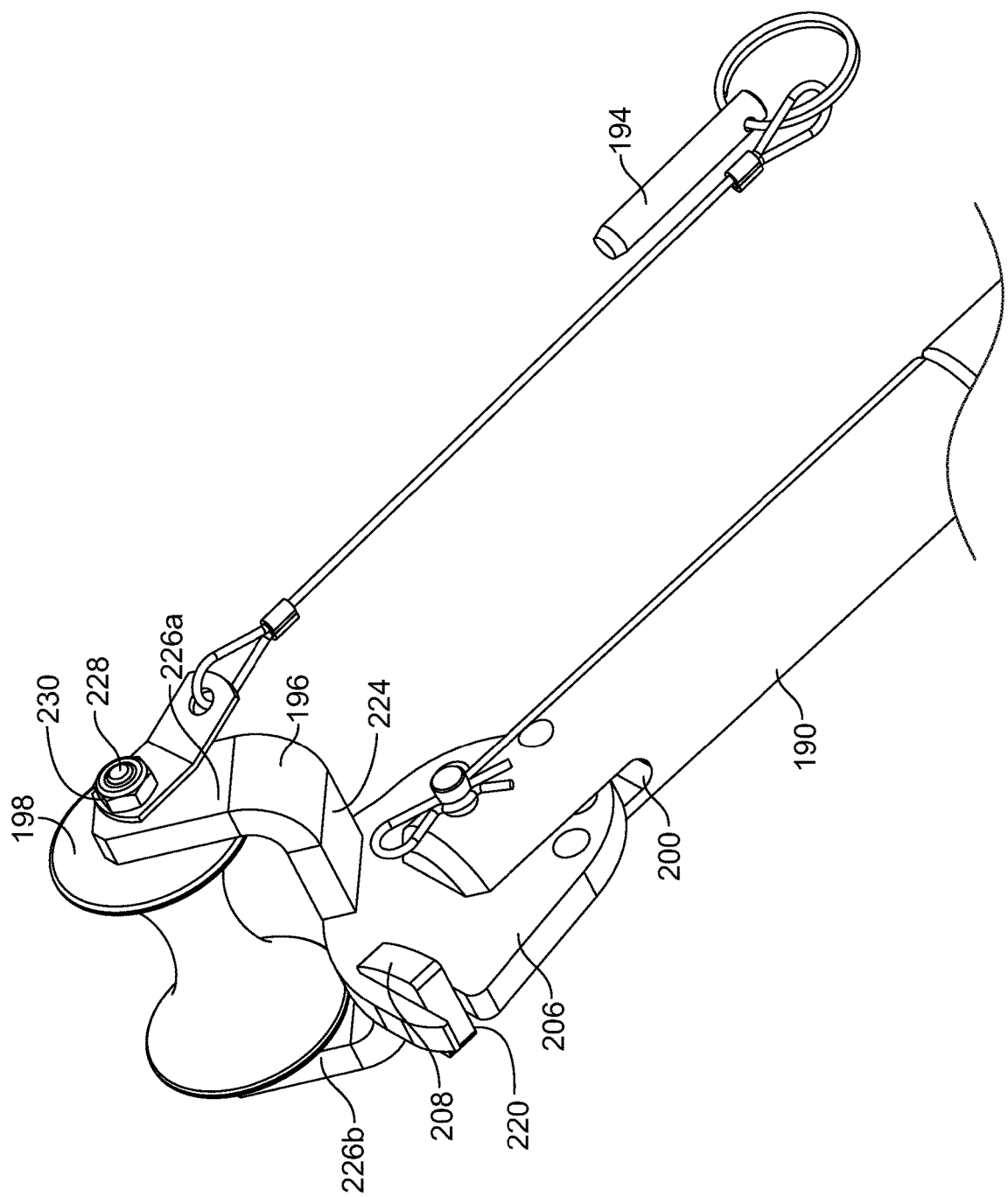
FIG. 25 depicts a partial perspective view of the portable drill puller.
Figure 26:
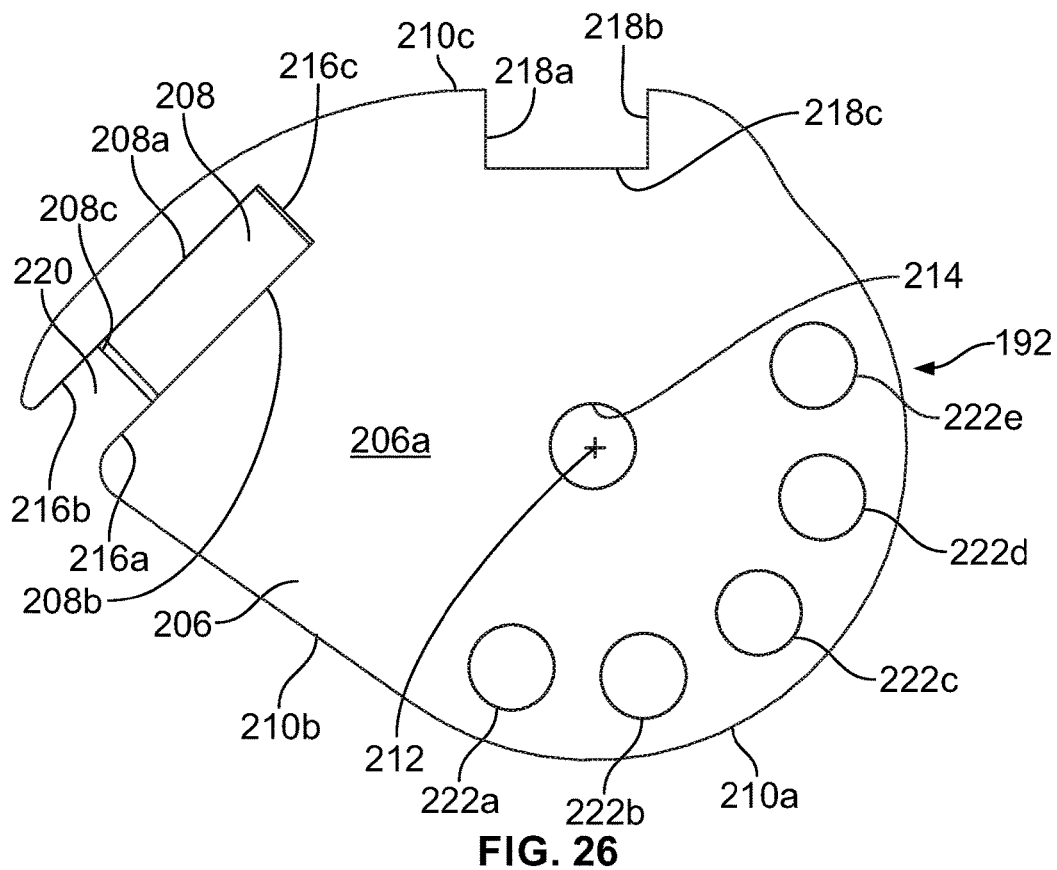
FIG. 26 depicts a side elevation view of an adjustable head of the portable drill puller.

As best shown in FIGS. 25 and 26, the outer edge or perimeter of the first plate 206, when viewed from looking at surface 192b, has a first section 210a which falls along a first radius that extends from a center 212 of a pivot hole 214, a second section 210b which extends along a tangent line of the first section 210b, and a third section 210c which extends between the first and second sections 210a, 210b. The second section 210b is linear, with the exception of a notch formed by a first wall 216a which extends from and is perpendicular to the second section 210b, a second wall 216b which extends from and is perpendicular to the second section 210b and which is spaced from the first wall 216a by a third wall 216c which is parallel to the second section 210b. In the example orientation shown in the drawings, the notch formed by the walls 216a, 216b, 216c is forward of the pivot hole 214 and vertically lower than the pivot hole 214. The third section 210c is generally curved, with the exception of a notch formed by a first wall 218a which extends from the third section 210c, a second wall 218b which extends from the third section 210c and which is spaced from the first wall 218a by a third wall 218c. In the example orientation shown in the drawings, the notch formed by the walls 218a, 218b, 218c is vertically above the pivot hole 214 and extends forwardly therefrom, and is vertically above the notch formed by the walls 216a, 216b, 216c.

The plate 208 is positioned within the walls 216a, 216b, 216c, but does not extend the full height of the walls 216a, 216b such that a recess 220 is formed by a lower surface 208c of the second plate 208, and the walls 216a, 216b. The plates 206, 208 are fixedly attached to each other, such as by welding.

The first plate 206 has a plurality of spaced apart apertures 222a, 222b, 222c, 222d, 222e therethrough. The apertures 222a, 222b, 222c, 222d, 222e are proximate to the first section 210a and the centers of the apertures 222a, 222b, 222c, 222d, 222e fall along an imaginary circle which has a radius extending from the center 212 of the pivot hole 214. While five apertures 222a, 222b, 222c, 222d, 222e are shown in the drawings, a fewer or greater number of apertures 222a, 222b, 222c, 222d, 222e can be provided.

The U-shaped bracket 196 has a base 224 with arms 226a, 226b extending upwardly therefrom (in the orientation shown in the drawings). The base 224 is fixedly attached to the wall 218c of the notch formed by the walls 218a, 218b, 218c by suitable means, such as welding. The base 224 extends perpendicular to the first plate 206.

The roller 198 is rotatably attached to the arms 226a, 226b of the bracket 196 by a headed unthreaded fastener 228 and a nut 230. The roller 198 is an hourglass shaped cylinder, and may be formed of aluminum. The roller 198 has an axis of rotation which is parallel to the axis of rotation of the head 203.

Figure 26A:
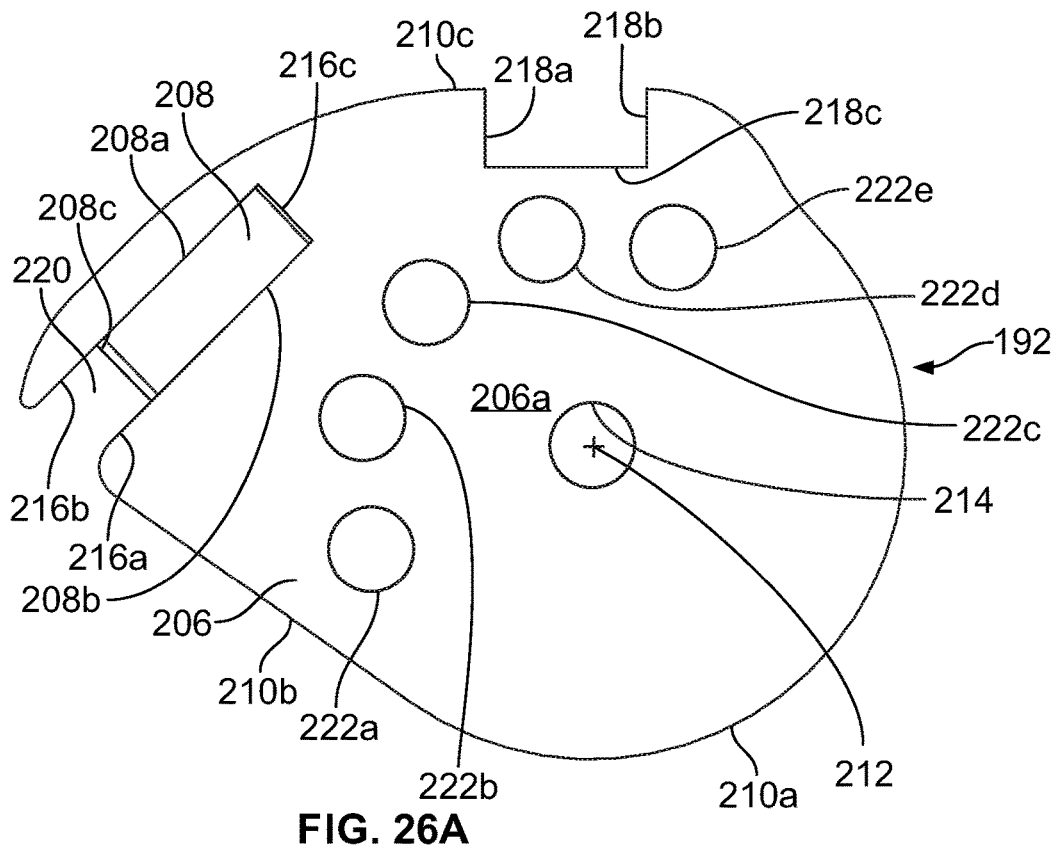
FIG. 26A depicts a side elevation view of an alternate embodiment of the adjustable head of the portable drill puller.
Figure 27:
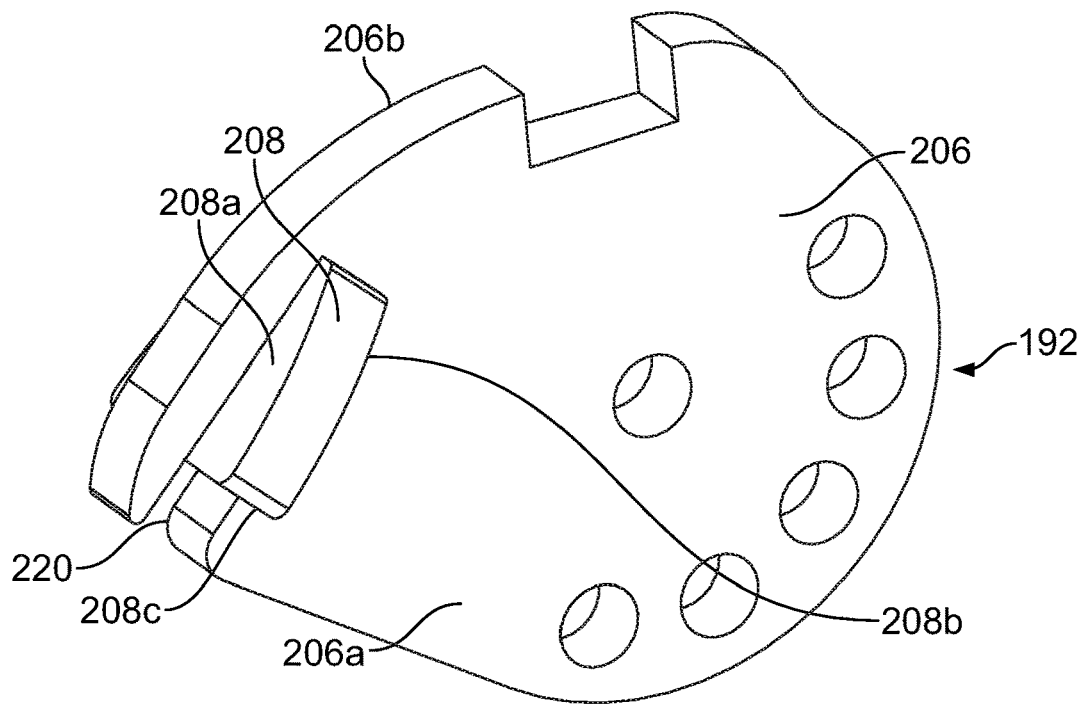
FIG. 27 depicts a perspective view of the adjustable head.

The first plate 206 of the head 192 seats within the slot 200 and is rotatably attached to the boom 190 proximate to the upper end 190a by a headed pivot pin 232, which may be for example, a screw or a unthreaded shaft with a head at an end thereof, that extends through openings in the boom 190, and through the pivot hole 214. The pin 232 defines an axis of rotation of the head 192 relative to the boom 190. A cotter pin 234 can be attached to a shaft of the pivot pin 232 to secure the pivot pin 232 to the boom 190. As shown from a side elevation of FIG. 26, in an embodiment, the plurality of spaced apart apertures 222a, 222b, 222c, 222d, 222e are on a first side of the axis of rotation defined by the pivot pin 232, and the recess 220 and the axis of rotation of the roller 198 are on a second side of the axis of rotation defined by the pivot pin 232. As shown from a side elevation of FIG. 26A, in another embodiment, the plurality of spaced apart apertures 222a, 222b, 222c, 222d, 222e, the recess 220 and the axis of rotation of the roller 198 are on the same side of the axis of rotation defined by the pivot pin 232.

In use, the head 192 is positioned in a desired orientation so that the recess 220 is proximate to the end surface 26a of the conduit 26 by rotating the head 192 around the pivot pin 232 to align a desired one of the apertures 222a, 222b, 222c, 222d, 222e with aligned openings 236 through the boom 190 that are in communication with the slot 200. As shown in FIG. 26, the openings 236 are aligned with aperture 222c. The retaining pin 194 is inserted through the openings 236 and the aperture 222c to secure the head 192 and the roller 198 in a desired position relative to the conduit 26.

Figure 6:
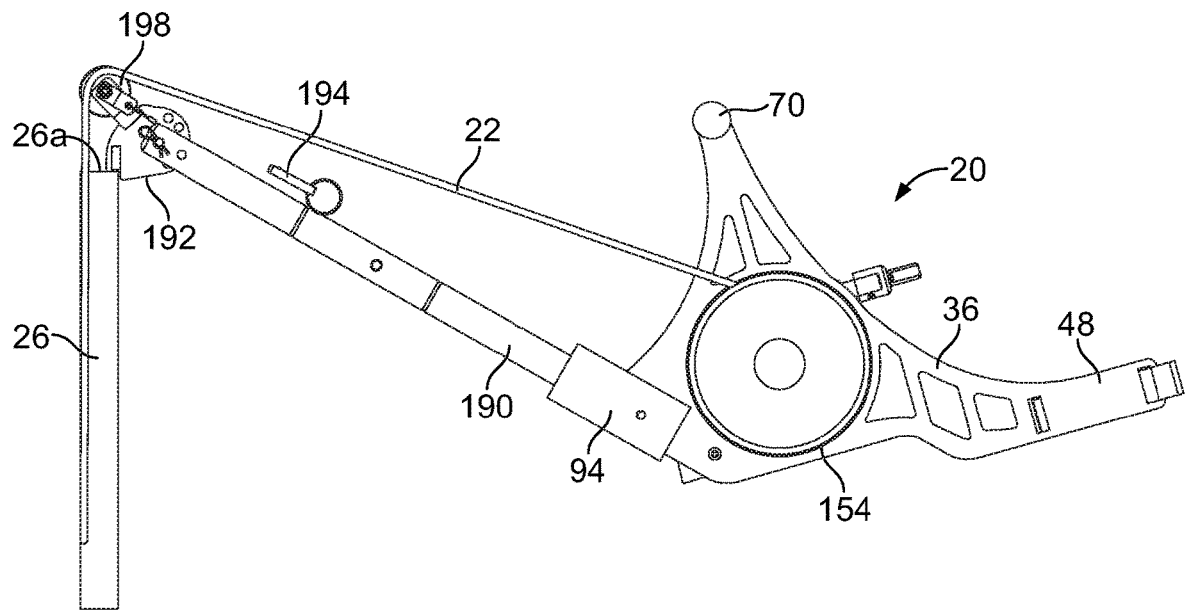
FIG. 6 depicts a side elevation views of the portable drill puller, a conduit and a pulling string.
Figure 7:
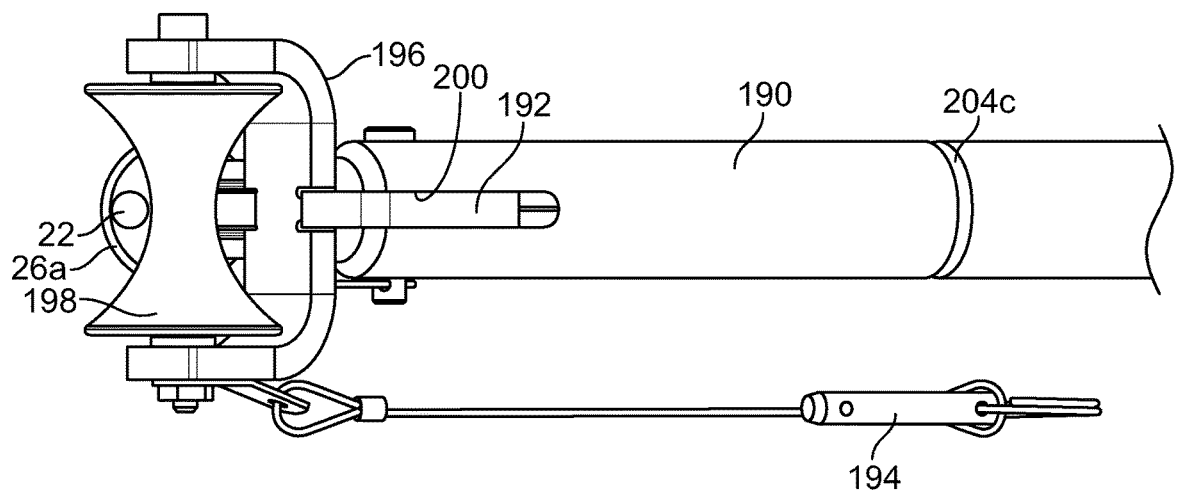
FIG. 7 depicts a partial top plan view of the portable drill puller, the conduit and the pulling string.

As shown in the particular orientation of FIG. 6, the bracket 196 positions the axis of rotation of the roller 198 above and forward of the axis of rotation of the pivot pin 232 and above and forward of the recess 220. The end surface 26a of the conduit 26 is positioned within the recess 220 and the lower surface 208c bears against the end surface 26a. The recess 220 is dimension such that a variety of wall thicknesses of conduit 26 can be positioned therewithin. The lower surface 208c provides additional surface area to bear against the end surface 26a of the conduit 26.

As shown in FIG. 6, when the pull string 22 exits the conduit 26, the pull string 22 extends upwardly and passes over the roller 198. The pull string 22 extends between the roller 198 and the capstan 152. During a pulling operation, the pull string 22 is then wound around the capstan 152. The roller 198 reroutes the pull string 22 from the conduit 26 towards the capstan 152 and provide a low friction contact between the pull string 22 and the drill puller 20.

It is to be understood that the head 192 and roller 198 can be placed into a variety of positions by rotating the boom 190 with in the boom receiving wall 94 and by adjusting the position of the head 192 relative to the boom 190.

In an embodiment, a boom extension (not shown) can be threadedly attached to the first portion 98a of the boom receiving wall 94 to extend the head 192 away from the capstan 152. The boom extension may take the form of rigid conduit having a thread which engages with the thread in the first portion 98a. Alternatively, the boom receiving wall 94 can have an opening (not shown) therethrough which accepts a thumb screw that engages with the boom extension. The boom 190 is seated within the boom extension and the head 192 bears against an opposite free end of the boom extension. The boom extension provides the ability for to access tight spaces and to bear the compressive load of the pull between the frame 36 and the head 192. In addition, the use of the boom extension provides for additional spacing between the head 192 and the capstan 152, thereby allowing for a longer tail of pull string 22 to pulled out, which is often desired by the operator.

Different situations will now be described for use of the drill puller 20.

Spooling Situation: Assume the run of conduit 26 already has pull string 22 fished into it and the pull string 22 has been connected to the cable that needs to be installed into the conduit 26. Also assume that operator needs to pull the pull string 22 down out of a conduit 26 that is coming out of the top of the electrical box (called a "down pull"). Lastly, assume the hand drill 24 is not coupled to drill puller 20. Note that the process will be very similar for an up, front, or side pull with the only major differentiating variable being the direction of gravity in each situation.

Setup: First the operator attaches the hand drill 24 to the drill puller 20. The chuck of the hand drill 24 is opened and the input shaft adaptor 132 is inserted therein. The operator ensures that the teeth of the chuck of the hand drill 24 meet with the flat surfaces 146 of the input shaft adaptor 132. Thereafter, the operator tightens the chuck of the hand drill 24. The operator then secures the handle 240 of the hand drill 24 to the frame 36 of the drill puller 20 with the strap 40. If the operator is using the monopod mount 42, the operator positions the drill puller 20 at a working height for setup. The operator inserts a cut piece of conduit 92 into the conduit receiving wall 74 of the monopod mount 42 and the operator can balance the drill puller 20 on the cut piece of conduit as described herein. If the operator is not using the monopod mount 42, the drill puller 20 is setup on the ground, or on the bottom or top of the electrical box.

The operator grasps the pull string 22 hanging from the conduit 26 and attaches the pull string 22 to the capstan 152. The operator pulls the trigger 238 of the hand drill 24 to start a few wraps to ensure the pull string 22 will not come off the capstan 152 and to take up any amount of slack in the pull string 22. Then, holding onto the hand drill 24 and the handle 38, the operator can position the roller 198 onto the pull string 22. Now the operator will pull the trigger 238 on the hand drill 24 to slowly begin spooling up any remaining slack in the pull string 22 until the tension in the pull string 22 becomes greater than the weight of the drill puller 20, in which the drill puller 20 will lift itself up until the operator engages the head 192 onto the conduit 26 by inserting the end surface 26a of the conduit 26 into the recess 220.

Operation: At this point the operator has engaged the head 192 with the conduit 26, has tension in the pull string 22 and is therefore ready to begin pulling the cable attached to the pull string 22. The operator will hold the trigger 238 of the hand drill 24 while watching the pull string 22 come down off the roller 198 and continuously spool up onto the capstan 152. If desired, the operator can change the speed of the pulling process by depressing the trigger 238 of the hand drill 24 at different depths or by switching between high or low gear on the hand drill 24. As the capstan 152 spins, the pull string 22 will be spooled up onto the capstan 152. Once the cable attached to the pull string 22 has been successfully pulled into the conduit 26, the operator may pull the cable around the roller 198 all the way up to the capstan 152 to make a "tail" which is desired by electricians after the pulling process. Depressing the trigger 238 causes the chuck of the hand drill 24 to rotate the input shaft adaptor 132, which in turn rotates the input shaft 110. The torque is transferred to the output shaft 112 via the gearbox 108. The torque is then transferred to the capstan 152 by the drive pin 160 and the pull string 22 is wound on the capstan 152. The gearbox 108 is used to transfer the power of the hand drill 24 to the capstan 152, to slow down the rotation of the capstan 152, and to enhance the torque of the hand drill 24 through a gear ratio.

Teardown: Now the pull string 22 can be cut at a location close to the cable. The operator can then unscrew the knob 156 and remove the end wall 154 from the end of the capstan 152. Either the pull string 22 will fall right off the capstan 152 or the operator will have to pull on the mass of spooled pull string 22 and the pull string 22 will easily come off the capstan 152. Finally, the operator can screw the knob 156 and end wall 154 back onto the end of the capstan 152 and the output shaft 112 and is ready to pull again.

Capstanning Situation: Assume the run of the conduit 26 already has pull string 22 inside therein and the pull string 22 has been connected to the cable that needs to be installed into the conduit 26. Also assume that operator needs to pull the pull string 22 up out of a conduit 26 that is coming out of the ground (called an "up pull"). Lastly, assume the hand drill 24 is already coupled to the drill puller 20 as described herein. Note that the process will be very similar for a down, front, or side pull with the only major differentiating variable being the direction of gravity in each situation.

Setup: First the operator wraps the pull string 22 around the capstan 152 with the tail side on the end flange 162 of the capstan 152. Then, holding onto the hand drill 24 and the handle 38, the operator can position the head 192 onto the conduit 26 using the recess 220 to secure the conduit 26 in place. The monopod mount 42 is used to balance the drill puller 20 on the cut piece of conduit 92. Now, the operator can route the pull string 22 from the conduit 26 around the roller 198.

Operation: The operator will pull the trigger 238 of the hand drill 24 to spin the capstan 152. While the capstan 152 is spinning, the operator can release the handle 38 balancing the drill puller 20 on the cut piece of conduit 92 in the monopod mount 42, grab the tail end of the pull string 22 and pull on the pull string 22. This will cause the pull string 22 to engage with the capstan 152, causing the pull string 22 to spin about the capstan 152 producing a pulling force. This capstanning process can be done intermittently with one person, who will need to regrip the pull string 22 after pulling a length equal to the stroke of their arm or be done with two people, in which one person holds the drill puller 20 and depresses the trigger 238 of the hand drill 24 and the other person pulls on the tail end of the pull string 22 with a continuous hand-over-hand method. If desired, the operator can change the speed of the pulling process by depressing the trigger 238 of the hand drill 24 at different depths or by switching between high or low gear on the hand drill 24. Once the cable attached to the pull string 22 has been successfully pulled into the conduit 25, the operator may pull the cable around the roller 198 all the way up to the capstan 152 to make a "tail" which is desired by electricians after the pulling process. Note that the Capstanning Situation may only be used with certain types of pull string 22.

Teardown: Now operator can release the trigger 238 of the hand drill 24 and the tail of the pull string 22. The operator can than unwrap the pull string 22 from the capstan 152 (without removing the end wall 154) and the drill puller 20 is now ready to pull again.

The pull string 22 does not contact the head 192 during the pulling operation as a result of the geometry of the head 192. As a result, a single roller 198 can be provided.

In addition to the providing an improved spooling capability, the drill puller 20 makes a Capstanning Situation easier by naturally clamping the end of the pull string 22 against the end flange 162 when the operator stops the pulling operator to regrip the tail end of the pull string 22.

The head 192 is universal and compatible with ½" to 4" Rigid, IMC and EMT conduit in most up, down, side, and front cable pulling scenarios, thereby eliminating the need for multiple sizes of head adaptors for different sized conduit or interchangeable booms.

Many pulling scenarios are in different positions and could potentially put the operator in an awkward position. By providing the handle 38 above the capstan 152, the weight of the drill puller 20 is evenly distributed and keeps the hands of the operator away from the moving parts. By positioning the handle 38 above the capstan 152, the operator is provided with an ergonomic position to control the drill puller 20 while in use.

The drill puller 20 is universal and accepts any standard drill driver, compact drill driver, hammer drill driver, or compact hammer drill driver. As a result, the drill puller 20 does not need to be adjusted for each type of hand drill 24 that is used.

Figure 28:
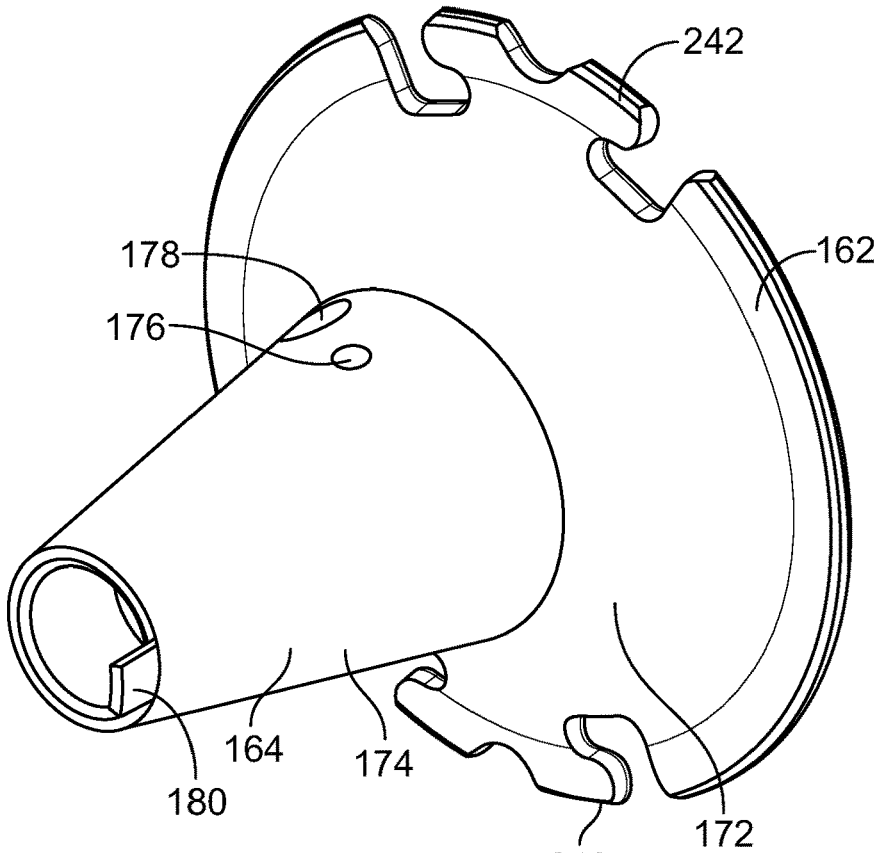
FIG. 28 depicts a perspective view of an alternate embodiment of the capstan.

In an embodiment as shown in FIG. 28, the capstan 152 has one or more casted in cleat(s) 242 in the end flange 162. The cleat 242 provides for a solid mounting point for the end of the pull string 22.

The input shaft adaptor 132 is universal for standard cordless drill drivers, compact drill drivers, hammer drill drivers and compact hammer drill drivers.

The drill puller 20 can be cordless and does not need a power outlet to operate.

The drill puller 20 provides a solution which replaces pulling by hand which may be a strenuous and inefficient process, and eliminates the requirement for a large cable puller for many larger cable pulls that are too difficult to pull by hand. In addition, since the portable drill puller 20 runs on battery, cable pulling jobs, for example parking lot lighting, which do not have easily accessible power outlets can be performed.

Also, the following examples are provided, which are numbered for easier reference.

1. A puller comprising: a frame; a capstan operatively mounted to the frame and rotatable relative thereto, the capstan having a first and second opposite ends, the capstan having an upstanding end flange at the first end and a body extending from the end flange, the body having an angled wall portion which has a greatest diameter proximate to the first end and a smallest diameter proximate to the second end; and an upstanding end wall attached to the second end of the capstan, the end wall being movable relative to the capstan.

2. The puller as defined in example 1, wherein the end wall is pivotable relative to the capstan, and further comprising a knob which is rotatable with the end wall and locks the end wall into an upstanding position.

3. The puller as defined in example 1, wherein the end wall is removable from the capstan.

4. The puller as defined in example 3, wherein the end wall is removably attached to the second end of the capstan by a knob which is rotatable with the end wall, and a tab extending outward from the second end of the body, the tab extending through a slot in the end wall.

5. The puller as defined in example 1, wherein the end wall has an end wall portion which is proximate to the second end of the capstan, and an extension wall portion extending from the end wall portion which overlays a section of the angled wall portion of the body.

6. The puller as defined in example 1, wherein the body further includes a passageway provided therethrough which is offset from a center axis of the body which is configured to accept a pull string therethrough.

7. The puller as defined in example 1, further comprising a driver mounted to the frame and configured to rotate the capstan.

8. The puller as defined in example 7, wherein the capstan has a passageway extending through the end flange and through the body and is axially aligned with a center of the body, and a through-bore extending through the body at an angle relative to the passageway and intersecting the passageway; and wherein the driver has an output shaft which extends through the frame and seats within the passageway in the capstan, the output shaft having a bore therethrough which is aligned with the through-bore in the capstan; and further comprising a pin extending through the through-bore in the capstan and through the bore of the output shaft.

9. The puller as defined in example 8, wherein the driver comprises a drill.

10. The puller as defined in example 9, wherein the driver further comprises a gearbox between the drill and the frame, and an adaptor between the drill and an input shaft of the gearbox.

11. The puller as defined in example 8, wherein the frame comprises a body portion from which the capstan extends, and an extension extending therefrom, the extension having a reduced height relative to the body, and the driver comprises a drill having a handle, the handle being mounted to the extension, wherein a portion of the handle of the drill is free from interference by the extension.

12. The puller as defined in example 11, wherein the drill is attached to the extension by an adjustable strap attached to the extension.

13. The puller as defined in example 1, wherein the end flange has a cleat formed therein.

14. The puller as defined in example 1, further comprising a handle which can be gripped by an operator, the handle being positioned above the capstan.

15. A drill puller comprising: a frame; a capstan operatively mounted to the frame and rotatable relative thereto; a drill coupled to the capstan and operable to rotate the capstan; a boom extending from the frame; a head having first and second sides and an outer edge extending therebetween, the head being rotatably coupled to the boom around an axis of rotation, the head including a plurality of spaced apart apertures extending between the sides and a recess formed in the outer edge thereof into which a conduit can be seated; a pin insertable through the boom and through one of the apertures, wherein the head is pivotable to a variety of positions relative to the boom with the pin locking the head into the variety of the positions; a bracket attached to the head, the bracket being spaced from the recess; and a roller attached to the bracket and rotatable relative thereto, the roller having an axis of rotation which is parallel to the axis of rotation of the head, the axis of rotation of the roller being on the second side of the of the axis of rotation of the head, the axis of rotation of the roller being offset from the recess and offset from the apertures.

16. The drill puller as defined in example 15, further comprising a plate extending outwardly from sides of the head, the plate being mounted within the recess.

17. The drill puller as defined in example 16, further comprising a boom receiving wall attached to the frame, the boom receiving wall having a passageway therethrough extending from a first end thereof to a second end thereof, the boom being seated within the passageway of the boom receiving wall, the boom receiving wall further having an aperture therethrough; and a pin insertable into the aperture and engageable with the boom.

18. The drill puller as defined in example 17, wherein the boom has a plurality of spaced apart passageways therethrough into which the pin is insertable to position the boom at a variety of positions relative to the boom receiving wall.

19. The drill puller as defined in example 17, wherein the passageway of the boom receiving wall has a threaded portion and an unthreaded portion.

20. The drill puller as defined in example 17, further comprising a monopod mount pivotably mounted on the frame, the monopod mount being below the boom receiving wall, the monopod mount having a passageway therein configured to accept a conduit therein.

21. The drill puller as defined in example 15, wherein the plurality of spaced apart apertures are on a first side of the axis of rotation and the recess is on a second side of the of the axis of rotation.

22. The drill puller as defined in example 15, wherein the roller is a single roller.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A portable drill puller used for installation of communication and electrical cables, comprising:
    a frame having a first surface and a second opposite surface;
    a capstan mounting shaft extending from the second surface of the frame and rotatably driven relative to the frame during use;
    a capstan having first and second opposite ends and being mounted on the capstan mounting shaft for rotation therewith, wherein a centerline is defined between the first and second ends, an upstanding end flange at the first end and a body extending from the end flange, the body having an angled wall portion which has a greatest diameter proximate to the first end and a smallest diameter proximate to the second end, wherein a pull string can be wound around the capstan;
    an upstanding end wall removably attached to the second end of the capstan which, wherein the end wall prevents the pull string from falling off of the capstan when the end wall is attached thereto, and wherein the pull string is allowed to slide off of the capstan when the end wall is detached from the capstan; and
    an attachment structure configured to attach the end wall, the capstan and the capstan mounting shaft together, the attachment structure comprising a shaft extending through the end wall and threadedly engaged with the capstan mounting shaft, wherein the shaft of the attachment structure is releasable from the capstan mounting shaft;
    an engagement structure configured to engage the end wall with the capstan to cause the end wall to rotate with the capstan, the engagement structure including a tab which extends through a slot; and
    a handle extending from the second surface of the frame and parallel to the centerline, the handle being gripped by an operator when in use.

2. A portable drill puller used for installation of communication and electrical cables using a drill having a handle, comprising:
    a frame comprises a body portion having a first surface and a second opposite surface and an extension extending from the body portion, the extension having a reduced height relative to the body portion, wherein the handle of the drill is configured to be mounted to the extension with a portion of the handle of the drill free from interference by the extension;
    a capstan mounting shaft extending from the second surface of the frame and rotatably driven relative to the frame during use;
    a capstan having first and second opposite ends and being mounted on the capstan mounting shaft for rotation therewith, wherein a centerline is defined between the first and second ends, an upstanding end flange at the first end and a body extending from the end flange, the body having an angled wall portion which has a greatest diameter proximate to the first end and a smallest diameter proximate to the second end, wherein a pull string can be wound around the capstan;

an upstanding end wall attached to the second end of the capstan which prevents the pull string from falling off of the capstan, and wherein the end wall is movable relative to the capstan to allow the pull string to slide off of the capstan; and a handle extending from the second surface of the frame and parallel to the centerline, the handle being gripped by an operator when in use.

3. The portable drill puller as defined in claim 1, wherein the tab extends outward from the second end of the body, and the slot is in the end wall.

4. The portable drill puller as defined in claim 3, wherein the slot defines a first slot in the end wall, and the end wall further has at least one additional slot therethrough, and wherein the tab is configured to seat within the first slot or the least one additional slot upon rotation of the end wall relative to the capstan.

5. The portable drill puller as defined in claim 4, wherein the tab and the slots are curved.

6. The portable drill puller as defined in claim 1, wherein the end wall has an end wall portion which is proximate to the second end of the capstan, and an extension wall portion extending from the end wall portion which overlays a section of the angled wall portion of the body.

7. The portable drill puller as defined in claim 1, wherein the body further includes a passageway provided therethrough which is offset from a center axis of the body which is configured to accept the pull string therethrough.

8. The portable drill puller as defined in claim 1,
wherein the capstan has a passageway extending through the end flange and through the body and is axially aligned with a center of the body, and a through-bore extending through the body at an angle relative to the passageway and intersecting the passageway; and
wherein the capstan mounting shaft extends through the frame and seats within the passageway in the capstan, the capstan mounting shaft having a bore therethrough which is aligned with the through-bore in the capstan; and
a pin extending through the through-bore in the capstan and through the bore of the capstan mounting shaft.

9. The portable drill puller as defined in claim 1, further comprising a drill, a gearbox between the drill and the frame, and an adaptor between the drill and an input shaft of the gearbox, the gearbox is coupled to the capstan mounting shaft.

10. The portable drill puller as defined in claim 1, wherein the end flange has a cleat formed therein.

11. The portable drill puller as defined in claim 1, further comprising a monopod mount pivotably mounted on the frame, the monopod mount having a passageway therein configured to accept a conduit therein.

12. The portable drill puller as defined in claim 1, further comprising a drill operatively couplable to the capstan mounting shaft.

13. The portable drill puller as defined in claim 1, wherein the handle extends over the capstan.

14. The portable drill puller as defined in claim 1, wherein the frame comprises a body portion from which the capstan and the handle extend, and an extension extending from the body portion and having a reduced height relative to the body portion, wherein a drill having a handle is configured to be mounted to the extension with a portion of the handle of the drill free from interference by the extension.

15. The portable drill puller as defined in claim 14, further comprising an adjustable strap attached to the extension, the adjustable strap is configured to attach the drill to the extension.

16. The portable drill puller as defined in claim 1, further comprising a gearbox coupled to the frame and operatively coupled to the capstan, wherein a rotatable input shaft of the gearbox is perpendicular to the centerline of the capstan.

17. The portable drill puller as defined in claim 1, wherein the shaft of the attachment structure extends from an enlarged handle portion.

18. The portable drill puller as defined in claim 2, wherein the end wall is pivotable relative to the capstan, and further comprising a knob which locks the end wall into an upstanding position.

19. The portable drill puller as defined in claim 2, further comprising an adjustable strap attached to the extension, the adjustable strap is configured to attach the drill to the extension.

20. The portable drill puller as defined in claim 2, further comprising the drill.

21. The portable drill puller as defined in in claim 2, wherein the end wall is removable from the capstan.

22. The portable drill puller as defined in claim 2, further comprising a monopod mount pivotably mounted on the frame, the monopod mount having a passageway therein configured to accept a conduit therein.

23. A portable drill puller used for installation of communication and electrical cables, comprising:
a frame;
a capstan operatively mounted to the frame and rotatable relative thereto, the capstan having first and second opposite ends, wherein a centerline is defined between the ends, an upstanding end flange at the first end and a body extending from the end flange, the body having an angled wall portion which has a greatest diameter proximate to the first end and a smallest diameter proximate to the second end, wherein a pull string can be wound around the capstan;
an upstanding end wall attached to the second end of the capstan which prevents the pull string from falling off of the capstan, and wherein the end wall is movable relative to the capstan to allow the pull string to slide off of the capstan;
a gearbox coupled to the frame and operatively coupled to the capstan, wherein a rotatable input shaft of the gearbox is perpendicular to the centerline of the capstan; and
a handle extending from the frame parallel to the centerline and positioned above the capstan, the handle being gripped by an operator when in use.

24. The portable drill puller as defined in claim 23, further comprising a drill operatively couplable to the input shaft of the gearbox.

25. The portable drill puller as defined in claim 24, wherein the gearbox has an output shaft on which the capstan is mounted, and an adaptor between the drill and the input shaft.

26. The portable drill puller as defined in claim 23, wherein the end wall is pivotable relative to the capstan, and further comprising a knob which locks the end wall into an upstanding position.

27. The portable drill puller as defined in claim 23, wherein the frame comprises a body portion from which the capstan and the handle extend, and an extension extending from the body portion and having a reduced height relative to the body portion, wherein a drill having a handle is configured to be mounted to the extension with a portion of the handle of the drill free from interference by the extension.

28. The portable drill puller as defined in claim 27, further comprising an adjustable strap attached to the extension, the adjustable strap is configured to attach the drill to the extension.

29. The portable drill puller as defined in in claim 23, wherein the end wall is removable from the capstan.

30. A portable drill puller for installation of communication and electrical cables comprising:
- a frame;
- a capstan operatively mounted to the frame and rotatable relative thereto, the capstan having a first and second opposite ends, an upstanding end flange at the first end and a body extending from the end flange, the body having an angled wall portion which has a greatest diameter proximate to the first end and a smallest diameter proximate to the second end, a passageway extending through the end flange and through the body and which is axially aligned with a center of the body, and a through-bore extending through the body at an angle relative to the passageway and intersecting the passageway, wherein a pull string can be wound around the capstan;
- an upstanding end wall attached to the second end of the capstan which prevents the pull string from falling off of the capstan, and wherein the end wall is movable relative to the capstan to allow the pull string to slide off of the capstan;
- a driver mounted to the frame and configured to rotate the capstan, the driver having an output shaft which extends through the frame and seats within the passageway in the capstan, the output shaft having a bore therethrough which is aligned with the through-bore in the capstan; and
- a pin extending through the through-bore in the capstan and through the bore of the output shaft.

31. The portable drill puller as defined in claim 30, wherein the driver comprises a drill, a gearbox between the drill and the frame, and an adaptor between the drill and an input shaft of the gearbox, the gearbox is coupled to the capstan.

\* \* \* \* \*